United States Patent
Akiyoshi

(10) Patent No.: US 8,294,922 B2
(45) Date of Patent: Oct. 23, 2012

(54) IMAGE FORMING APPARATUS, USER RESTRICTION METHOD AND USE HISTORY GENERATION METHOD

(75) Inventor: Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/285,952

(22) Filed: Oct. 31, 2011

(65) Prior Publication Data

US 2012/0062931 A1   Mar. 15, 2012

Related U.S. Application Data

(63) Continuation of application No. 12/842,786, filed on Jul. 23, 2010, now Pat. No. 8,064,078, which is a continuation of application No. 11/832,254, filed on Aug. 1, 2007, now Pat. No. 7,787,137, which is a continuation of application No. 10/274,882, filed on Oct. 22, 2002, now Pat. No. 7,280,238.

(30) Foreign Application Priority Data

Oct. 22, 2001 (JP) ................................ 2001-324111
Oct. 17, 2002 (JP) ................................ 2002-303169

(51) Int. Cl.
*G06F 15/00* (2006.01)
*G06K 1/00* (2006.01)
*G06K 15/00* (2006.01)
*G06F 3/12* (2006.01)

(52) U.S. Cl. ...................................... 358/1.14; 358/1.13
(58) Field of Classification Search ........................ None
See application file for complete search history.

(56) References Cited

U.S. PATENT DOCUMENTS

| | | | |
|---|---|---|---|
| 5,625,757 A | 4/1997 | Kageyama et al. | |
| 5,694,222 A | 12/1997 | Yamada | |
| 6,903,840 B1 | 6/2005 | Maymin et al. | |
| 6,920,558 B2 * | 7/2005 | Sames et al. | 713/166 |
| 2001/0053301 A1 | 12/2001 | Nishii | |
| 2001/0054157 A1 | 12/2001 | Fukumoto | |
| 2001/0056449 A1 | 12/2001 | Kawamoto et al. | |
| 2002/0062453 A1 | 5/2002 | Koga | |
| 2003/0012415 A1 | 1/2003 | Cossel | |
| 2003/0154403 A1 * | 8/2003 | Keinsley et al. | 713/201 |
| 2004/0204970 A1 | 10/2004 | Boden et al. | |

FOREIGN PATENT DOCUMENTS

| | | |
|---|---|---|
| JP | 11-311927 | 11/1999 |
| JP | 2001-5347 | 1/2001 |
| JP | 2001-156958 | 6/2001 |

* cited by examiner

*Primary Examiner* — Douglas Tran
(74) *Attorney, Agent, or Firm* — Oblon, Spivak, McClelland, Maier & Neustadt, L.L.P.

(57) ABSTRACT

An image forming apparatus is provided, in which the image forming apparatus includes a user database in which user identification information for identifying an user of the image forming apparatus is registered, an operation panel for receiving a key operation input, a secure program used for determining whether a user service can be provided on the basis of the user identification information in the user database and another user identification information input by the user.

8 Claims, 21 Drawing Sheets

USER SERVICE NAME
FOR WHICH THE USER HAS
USE RIGHT
(EX. "COPY : FACSIMILE")

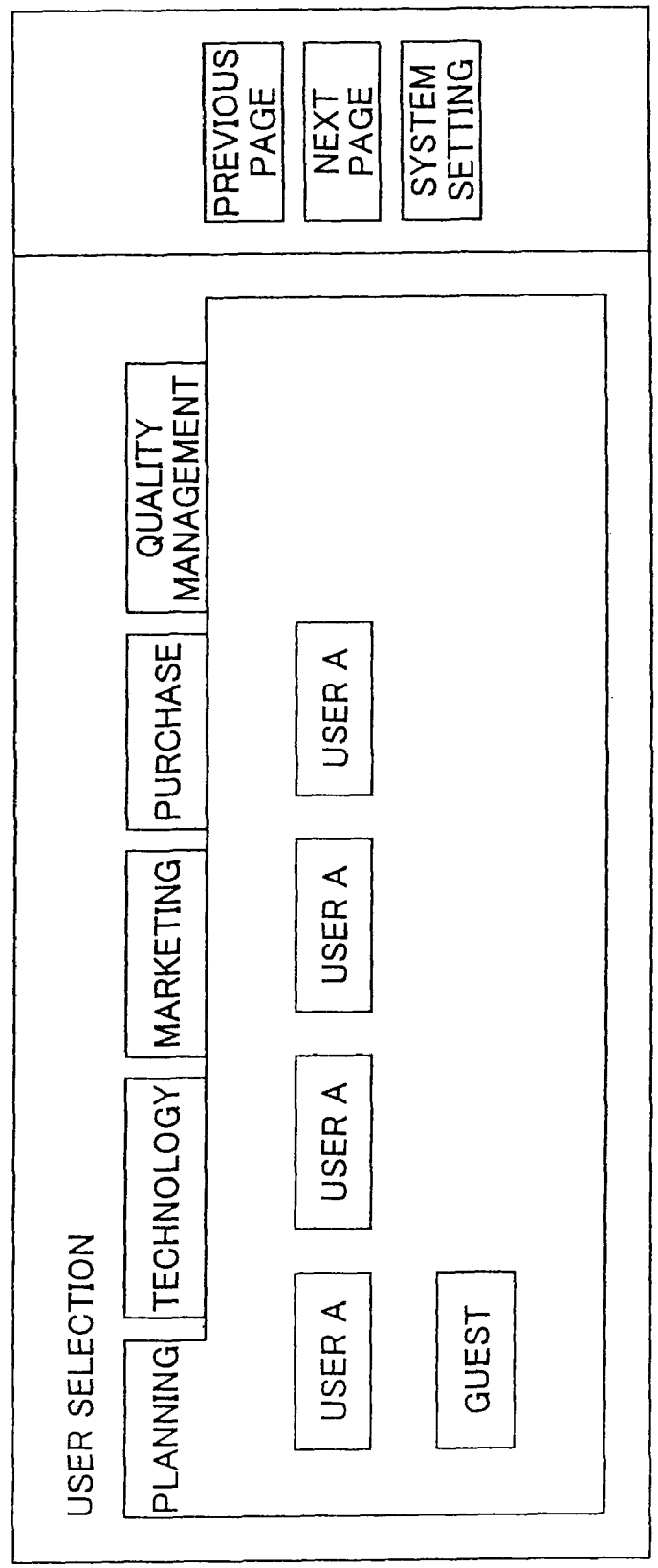

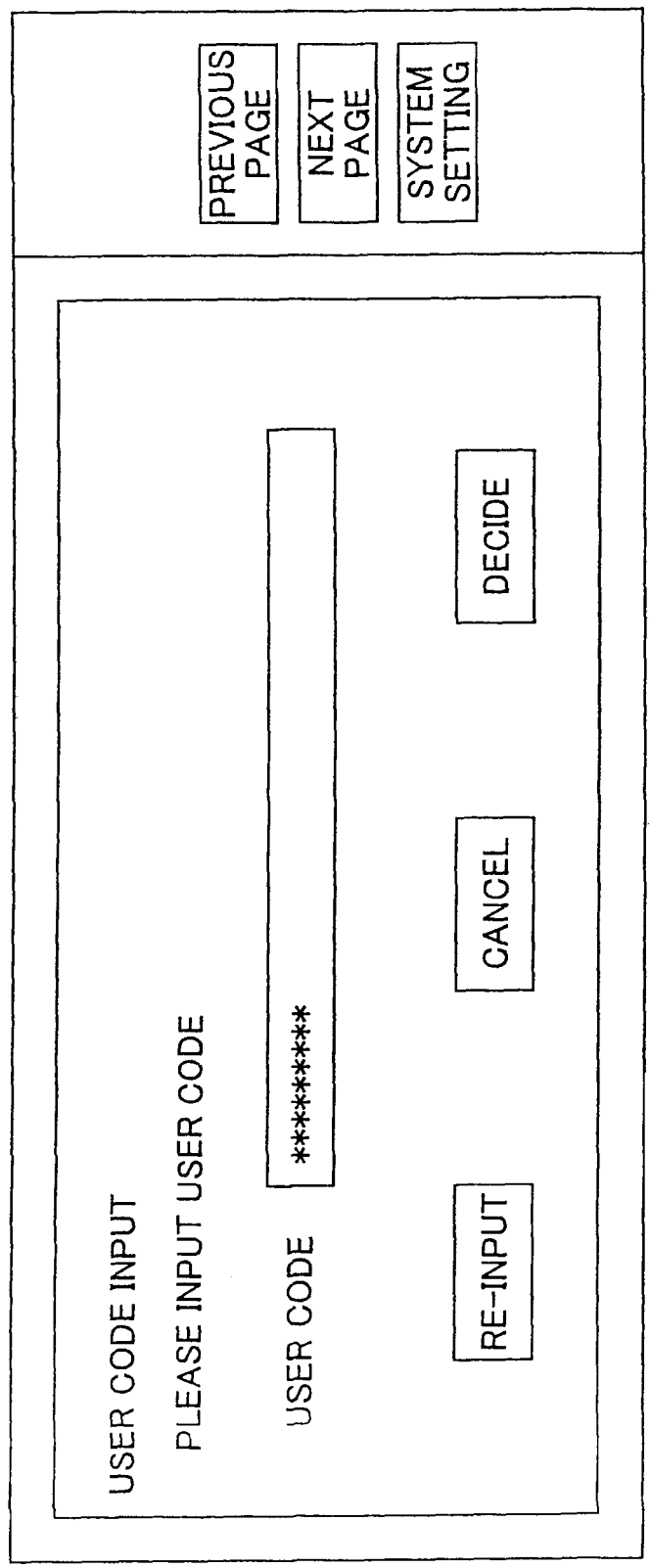

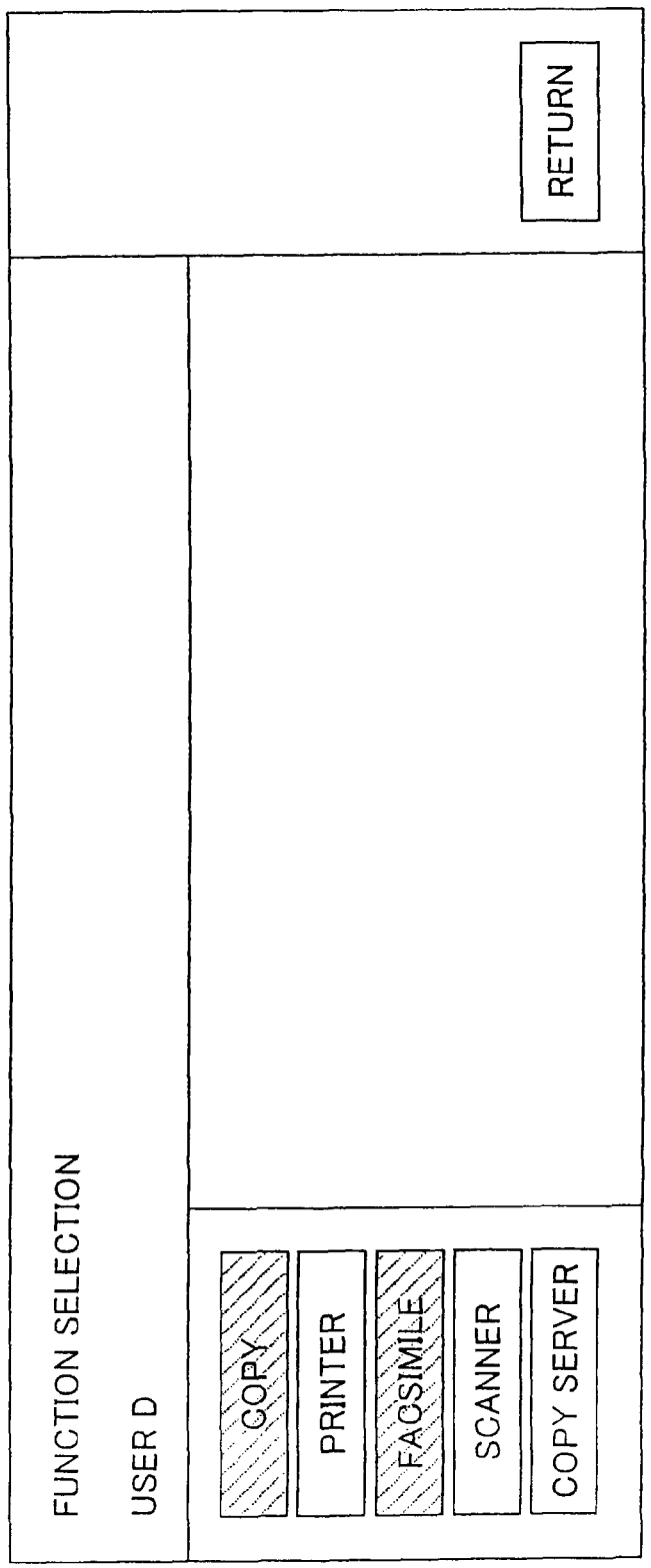

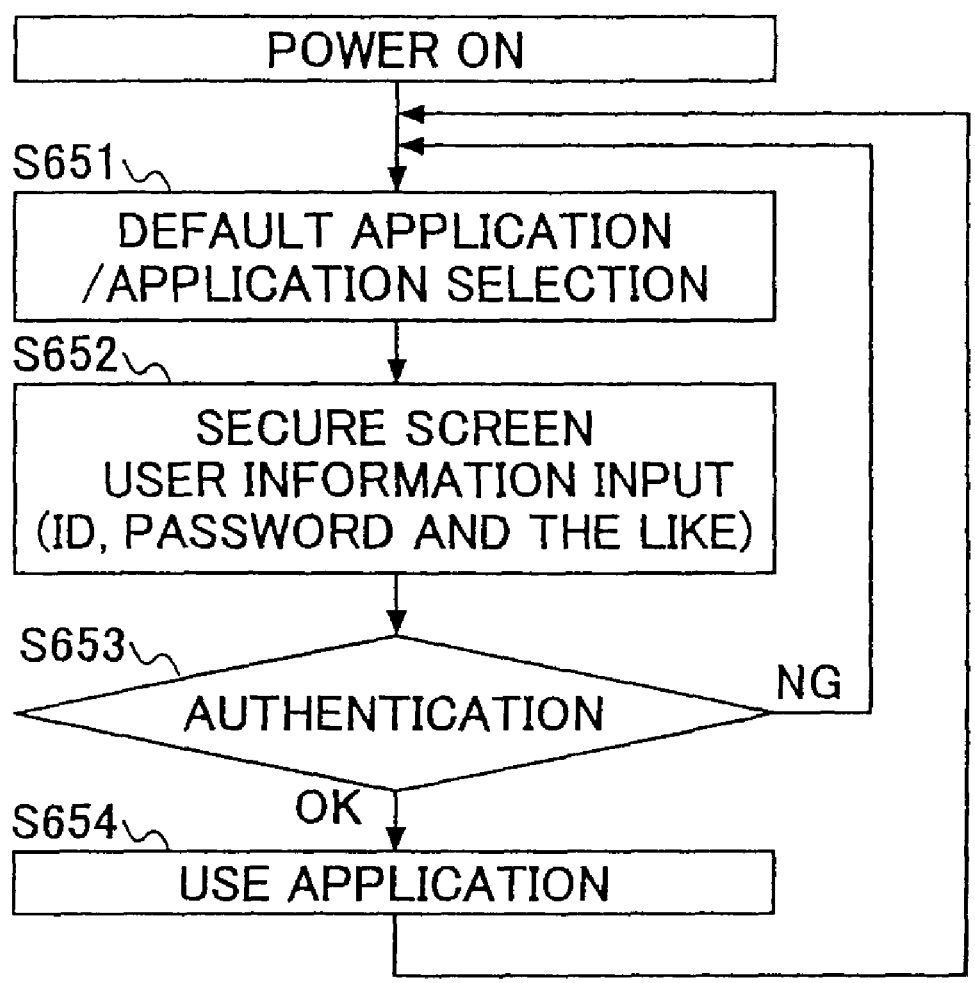

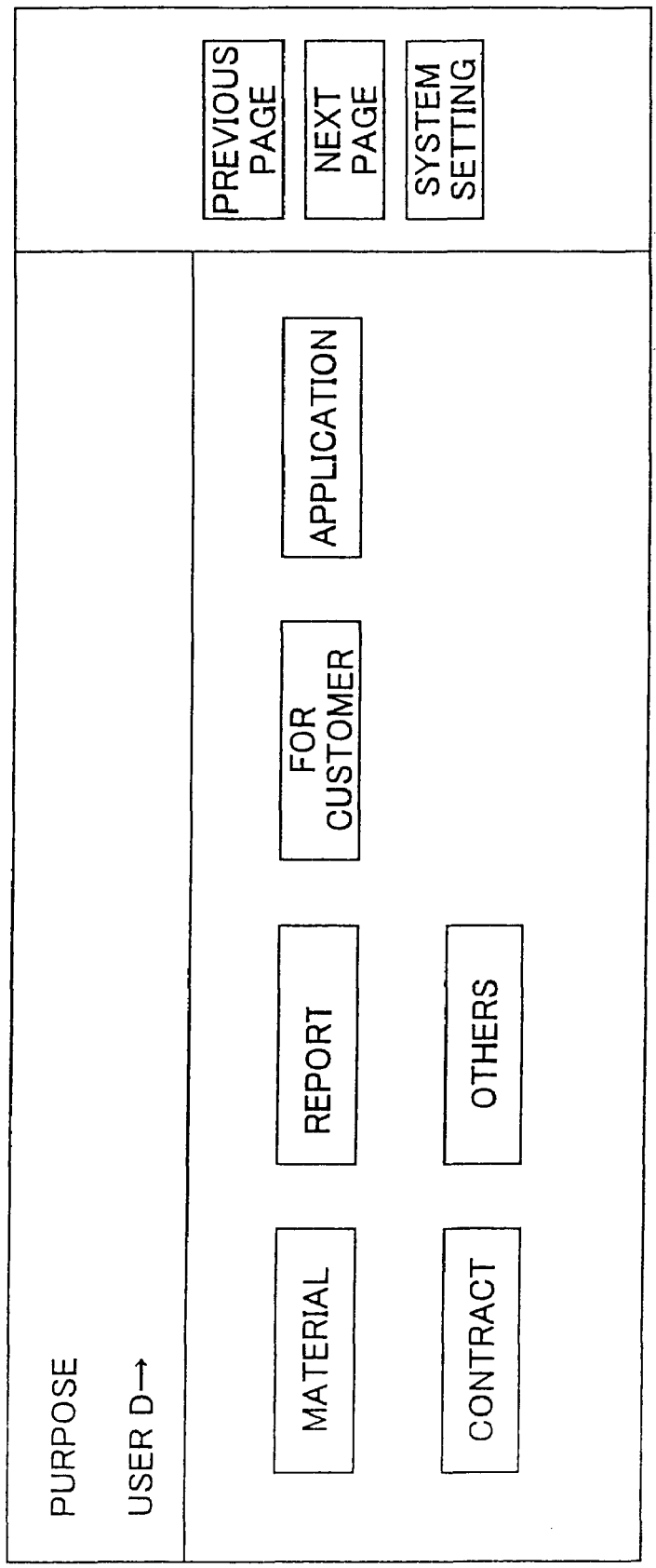

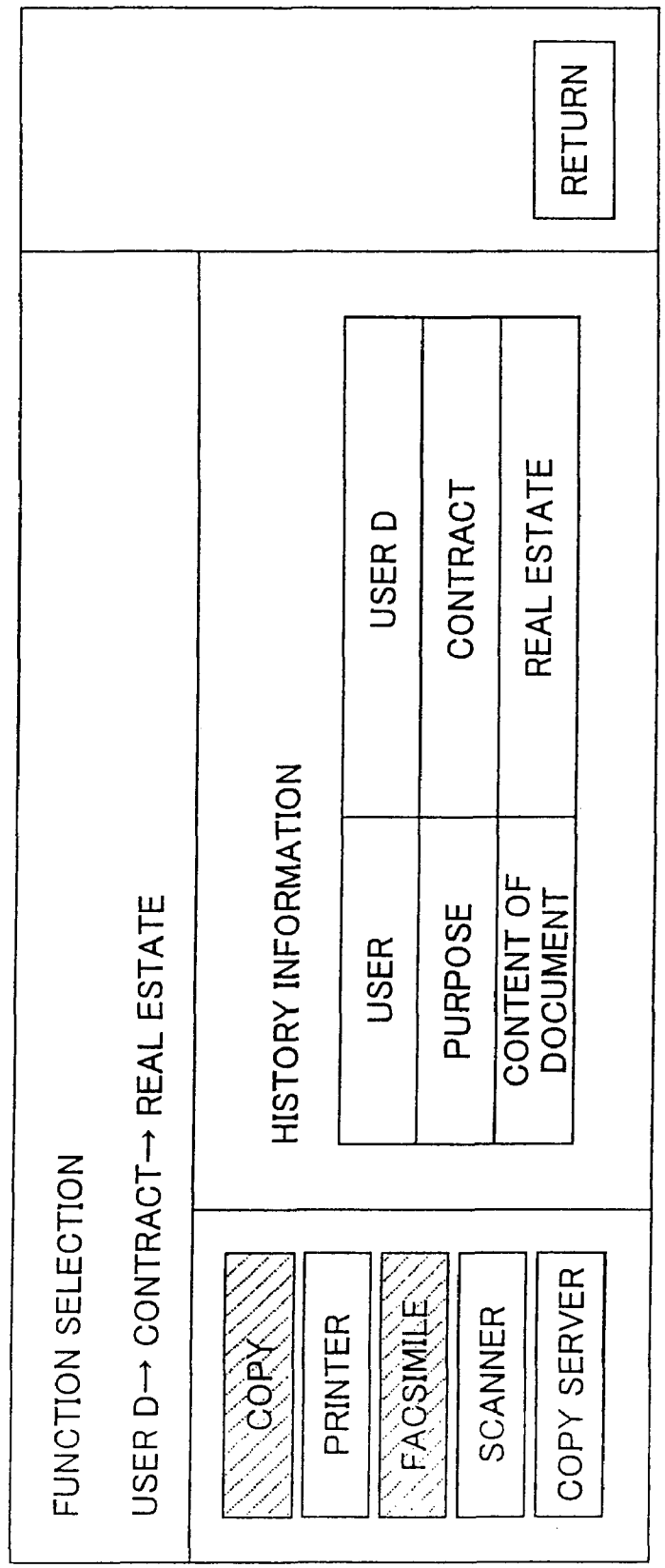

FIG.15

| DATE OF USE | TIME OF USE | USER CODE | DOCUMENT NAME | PURPOSE | FUNCTION | PAPER | NUMBER |
|---|---|---|---|---|---|---|---|
| 2001/4/10 | 10:10 | 12345678 | REAL ESTATE | CONTRACT | COPY | A4 | 2 |
| 2001/4/10 | 10:50 | 12345550 | GO OUT SET | FOR CUSTOMER | COPY | B5 | 10 |
| 2001/4/11 | 9:30 | 33126678 | APPLICATION FORM | APPLICATION | FACSIMILE | A4 | 3 |
| ... | ... | ... | ... | ... | ... | ... | ... |

IMAGE FORMING APPARATUS, USER RESTRICTION METHOD AND USE HISTORY GENERATION METHOD

CROSS-REFERENCE TO RELATED APPLICATION

This application is a continuation application of 12/842,786 filed Jul. 23, 2010, and claims the benefit of priority under 35 U.S.C. §120 from, U.S. application Ser. No. 12/842,786, filed Jul. 23, 2010 now U.S. Pat. No. 8,064,078, herein incorporated by reference, which is a continuation of Ser. No. 11/832,254 filed Aug. 1, 2007 U.S. Pat. No. 7,787,137, issued Aug. 31, 2010, herein incorporated by reference, which is a continuation of Ser. No. 10/274,882 filed Oct. 22, 2002 U.S. Pat. No. 7,280,238, issued Oct. 9, 2007, herein incorporated by reference, which claims the benefit of priority under 35 U.S.C. §119 from Japanese Patent Applications Nos. 2001-324111, filed Oct. 22, 2001 and 2002-303169, filed Oct. 17, 2002.

BACKGROUND OF THE INVENTION

1. Field of the Invention

The present invention relates to an image forming apparatus which can perform restriction of use and can obtain history information on status of use when the image forming apparatus provides user services related to image forming processes such as copying, printing, scanning and sending facsimile. In addition, the present invention relates to a user restriction method and a use history generation method.

2. Description of the Related Art

Recently, an image forming apparatus (to be referred to as a compound machine hereinafter) that includes functions of a printer, a copier, a facsimile, a scanner and the like in a cabinet is generally known. The compound machine includes a display part, a printing part and an image pickup part and the like in a cabinet. In the compound machine, three pieces of software corresponding to the printer, copier and facsimile respectively are provided, so that the compound machine functions as the printer, the copier, the scanner and the facsimile respectively by switching the software.

Since the conventional compound machine is provided with each software for the printer, the copier, the scanner and the facsimile individually, much time is required for developing the software. Therefore, the applicant has developed an image forming apparatus (compound machine) including hardware resources, a plurality of applications, and a platform including various control services provided between the applications and the hardware resources. The hardware resources are used for image forming processes of a display part, a printing part and an image pickup part. The applications perform processes intrinsic for user services of printer, copier and facsimile and the like. The platform includes various control services performing management of hardware resource necessary for at least two applications commonly, execution control of the applications, and image forming processes, when a user service is executed.

Since the image forming apparatus includes the platform that performs management of hardware resources used by at least two applications commonly, and that performs execution control and image forming processes, software can be developed efficiently, so that productivity for the machine can be improved.

However, as for such compound machine, it is not desirable, from the viewpoint of security, that every user can use all functions of the printer, copier, scanner and facsimile without restriction. For example, it may be necessary to restrict use of the compound machine or use of some functions of the compound machine according to a section the user belongs to or according to a position of the user.

The user of the compound machine uses functions of the printer, copier, scanner and facsimile for various purposes. Thus, by recording status of use such as a use purpose as history information, it becomes possible to strengthen security in consideration of past use status.

However, since each piece of software is provided for each of the functions of the printer, the copier, the scanner and the facsimile according to the conventional compound machine, it is necessary to provide a security function to each piece of software for strengthening security of the compound machine. Thus, there is a problem in that enormous amounts of developing work is necessary and the structure of the software is complicated.

SUMMARY OF THE INVENTION

An object of the present invention is provide an image forming apparatus, a user restriction method, a use history generation method and a program for easily realizing enhancement of security.

The above object is achieved by an image forming apparatus, including:

at least an application for providing a user service relating to an image forming process;

an operation panel for receiving a key operation input;

a user database in which user identification information for identifying an user of the image forming apparatus is included;

a secure program used for determining whether the user service can be provided on the basis of the user identification information in the user database and another user identification information input by the user.

According to this image forming apparatus, use of the image forming apparatus can be restricted to users registered beforehand, so that security improves for the image forming apparatus.

In addition, the above object is achieved by an image forming apparatus, including:

at least an application for providing a user service relating to an image forming process;

an operation panel for receiving a key operation input;

a secure program for requesting a user to input use information on use status of the image forming apparatus, and generating use history information on the use information; and a control program for obtaining a key event on the use information input from the operation panel, and sending the key event to the secure program.

According to this image forming apparatus, use history can be recorded, so that security improves by using the use history.

Since the new compound machine developed by the applicant has a distinctive structure including applications and the control service for providing a service necessary for at least two of the applications, it is easy to develop new software as a new application or as a new control service. Thus, it becomes easy to add software for realizing the security function by using the distinctive structure.

BRIEF DESCRIPTION OF THE DRAWINGS

Other objects, features and advantages of the present invention will become more apparent from the following detailed description when read in conjunction with the accompanying drawings, in which:

FIGS. 9A-9C shows examples of screens displayed on the display part of the operation panel 210 in the user restriction process;

FIG. 10 shows a process flow in the case where the secure application 117 is not set as the priority application;

FIGS. 14A-14C are examples of the screen displayed on the display part of the operation panel 210 in the use history generation process;

FIG. 15 shows an example of the use history file 1735;

DETAILED DESCRIPTION OF THE PREFERRED EMBODIMENTS

In the following, embodiments of an image forming apparatus, a user restriction method, a use history generation method and a program for causing a computer to execute the methods of the present invention will be described with reference to figures.

First Embodiment

Figure 1:
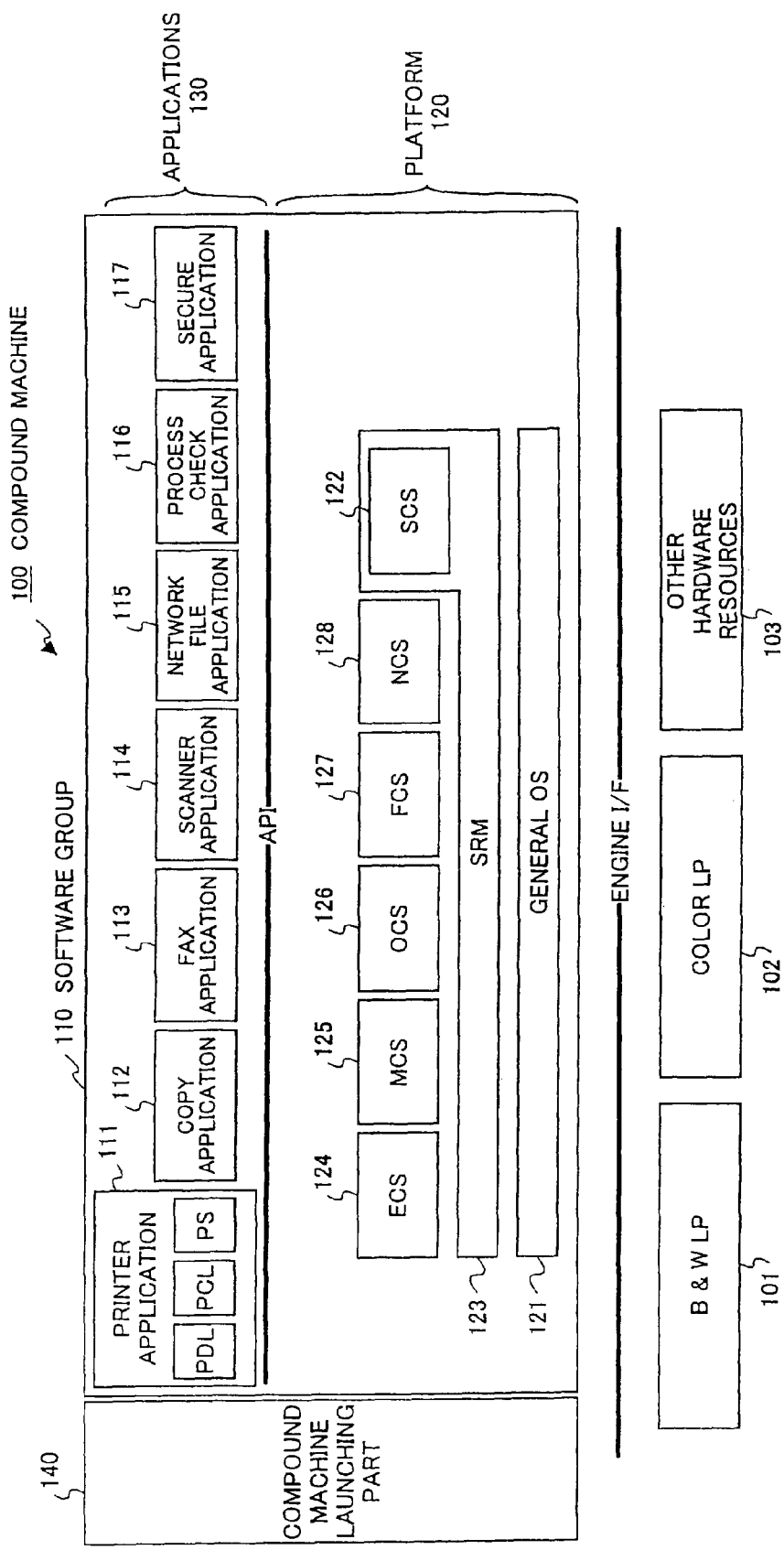
FIG. 1 is a block diagram of an image forming apparatus according to the first embodiment of the present invention.

FIG. 1 is a block diagram of an image forming apparatus (to be referred to as a compound machine hereinafter) according to the first embodiment of the present invention. As shown in FIG. 1, the compound machine 100 includes hardware resources and a software group 110. The hardware resources include a black and white line printer (B&W LP) 101, a color line printer 102, and hardware resources 103 including a scanner, a facsimile, a hard disk and a network interface. The software group 110 includes a platform 120 and applications 130.

The platform 120 includes control services for interpreting a processing request from an application to issue an acquiring request for the hardware resource, a system resource manager (SRM) 123 for managing one or more hardware resources and arbitrating acquiring requests from the control service, and a general-purpose OS 121.

The control services include a plurality of service modules including a system control service (SCS) 122, an engine control service (ECS) 124, a memory control service (MCS) 125, a fax control service (FCS) 127, and a network control service (NCS) 128. In addition, the platform 120 has application program interfaces (API) that can receive process requests from the applications 130 by using predetermined functions.

The general purpose OS 121 is a general purpose operating system such as UNIX, and can execute each piece of software of the platform 120 and the applications 130 concurrently.

Processes of the SRM 123 are for performing control of the system and performing management of resources with the SCS 122. The processes of the SRM 123 perform arbitration and execution control for requests from the upper layer that uses hardware resources including engines such as the scanner part and the printer part, a memory, a HDD file, a host I/Os (Centronics I/F, network I/F IEEE1394 I/F, RS232C I/F and the like).

Specifically, the SRM 123 determines whether the requested hardware resource is available (whether it is not used by another request), and, when the requested hardware resource is available, notifies the upper layer that the requested hardware resource is available. In addition, the SRM 123 performs scheduling for using hardware resources for the requests from the upper layer, and directly performs processes corresponding to the requests (for example, paper transfer and image forming by a printer engine, allocating memory area, file generation and the like).

The processes of the SCS 122 perform application management, control of the operation part, display of system screen, LED display, resource management, and interrupt application control. In addition, in the compound machine in the first embodiment, the SCS 122 sends a notification message o providing control right for the operation panel 210 to each application 130, and the SCS 122 receives a key event from the operation panel 210 via the OCS 126.

Processes of the ECS 124 control hardware resources including the white and black line printer (B&W LP) 101, the color line printer (Color LP) 102, the scanner 104, and the facsimile 104. The process of the MCS 125 obtains and releases an area of the image memory, uses the hard disk apparatus (HDD), and compresses and expands image data.

The processes of the FCS 127 provide APIs for sending and receiving of a facsimile from each application layer of the system controller by using a PSTN/ISDN network, for registering/referring of various kinds of facsimile data managed by BKM (backup SRAM), for facsimile reading, for facsimile receiving and printing, and for mixed sending and receiving.

The NCS 128 is a process for providing services commonly used for applications that need the network I/O. The NCS 128 distributes data received from the network by each protocol to a corresponding application, and acts as mediation between the application and the network when sending data to the network.

The OCS 126 controls an operation panel 210 that is a means for transferring information between the operator (user) and control parts of the machine. In the compound machine 100 of the first embodiment, the OCS 126 includes an OCS process part and an OCS function library part. The OCS process part obtains an key event, which indicates that the key is pushed, from the operation panel 21, and sends a key event function corresponding to the key event to the SCS 122. The OCS function library registers drawing functions and other functions for controlling the operation panel, in which the drawing functions are used for outputting various images on the operation panel on the basis of a request from an application 130 that has control right or from the control service. The OCS function library corresponds to the service function library of the present invention. When the application 130 is developed, functions in the OCS function library is linked to an object program that is generated by compiling a source code file of the application 130, so that an executable file of the application 130 is generated.

Although the OCS 126 is formed by the part executed by a process and the OCS function library in the compound machine 100 of the first embodiment, the OCS 126 can be configured such that the whole of the OCS 126 operates as a process, or such that the whole of the OCS 126 is formed by the OCS function library.

The application 130 includes a printer application 111 that is an application for a printer having page description language (PDL) and PCL and post script (PS), a copy application 112, a fax application 113 that is an application for facsimile, a scanner application 114 that is an application for a scanner, a network file application 115 and a process check application 116, and a secure application 117 for performing a process of restricting use of the compound machine 100 by a use and a process of restricting use of some functions.

The secure application 117 performs a user restriction process, in which the secure application 117 checks a user of the compound machine 100 by using a user code, and restricts use of the compound machine 100 such that only a user having the user code registered in an after-mentioned user database 320 can use the compound machine. In addition, on the basis of rights of use registered in the user database 320, the secure application 117 can provide only functions for which the user has the right of use among user services such as copy, printer, scanner and facsimile. In addition, the secure application 117 requests the operation panel 210 to display various screens at the time of the user restriction process. The detailed operations of the secure application 117 will be described later.

Figure 2:
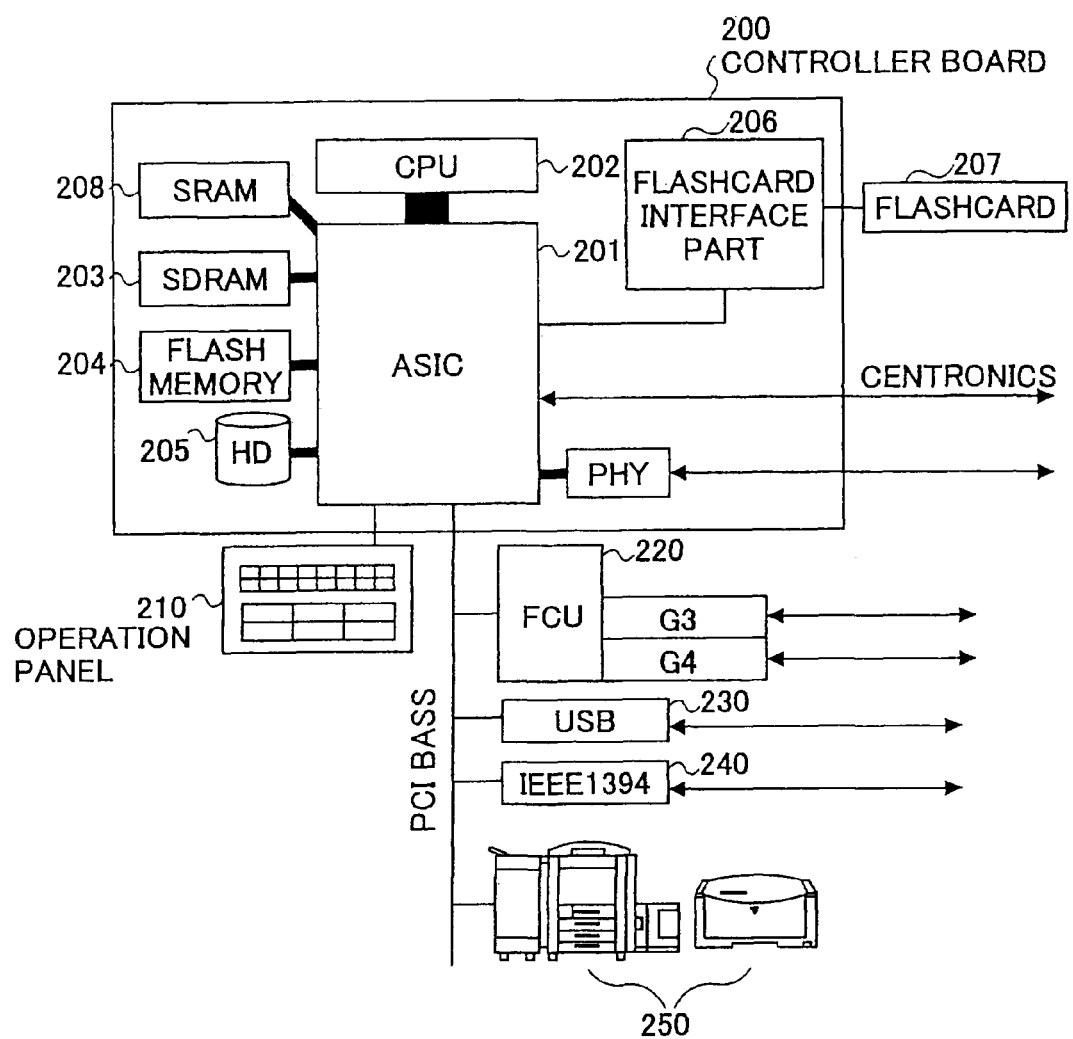
FIG. 2 shows a hardware configuration of the compound machine 100 according to the first embodiment.

FIG. 2 shows a hardware configuration of the compound machine 100 according to the first embodiment. As shown in FIG. 2, the compound machine 100 includes a controller board 200, an operation panel 210, a fax control unit (FCU) 220, a USB 230, an IEEE1394 240, and a printer 250. The controller board 200 includes a CPU 202, a SDRAM 203, a SRAM 208, a flash memory (flash ROM) 204, a flash card interface part 206 and a HD 205 that are connected to the ASIC 201. The operation panel 210 is directly connected to the ASIC 201. The FCU 220, the USB 230, the IEEE1394 240 and the printer 250 are connected to the ASIC 201 via the PCI bus.

The SRAM 208 is a nonvolatile RAM including a priority application area in which applications having control right are registered. The SDRAM 203 keeps the priority application area copied from the SDRAM 208 by the SCS 122, an application registration area for registering applications that operates on the compound machine 100, and a shared memory area. The shared memory area is used for interprocess communication between a process of the application 130 and a process of the SCS 122. The SDRAM 203 forms a memory part of the present invention.

A flashcard 207 is inserted into a flash card interface part 206, so that data is sent/received between the compound machine 100 and the flashcard 207 via the flash card interface part 206. The flashcard 207 stores billing information of the user and the like.

The operation panel 210 includes an operation part used for key operation such as key input and button pushing and the like by the user, and an display part for displaying drawing data such as various screens.

Figure 3:
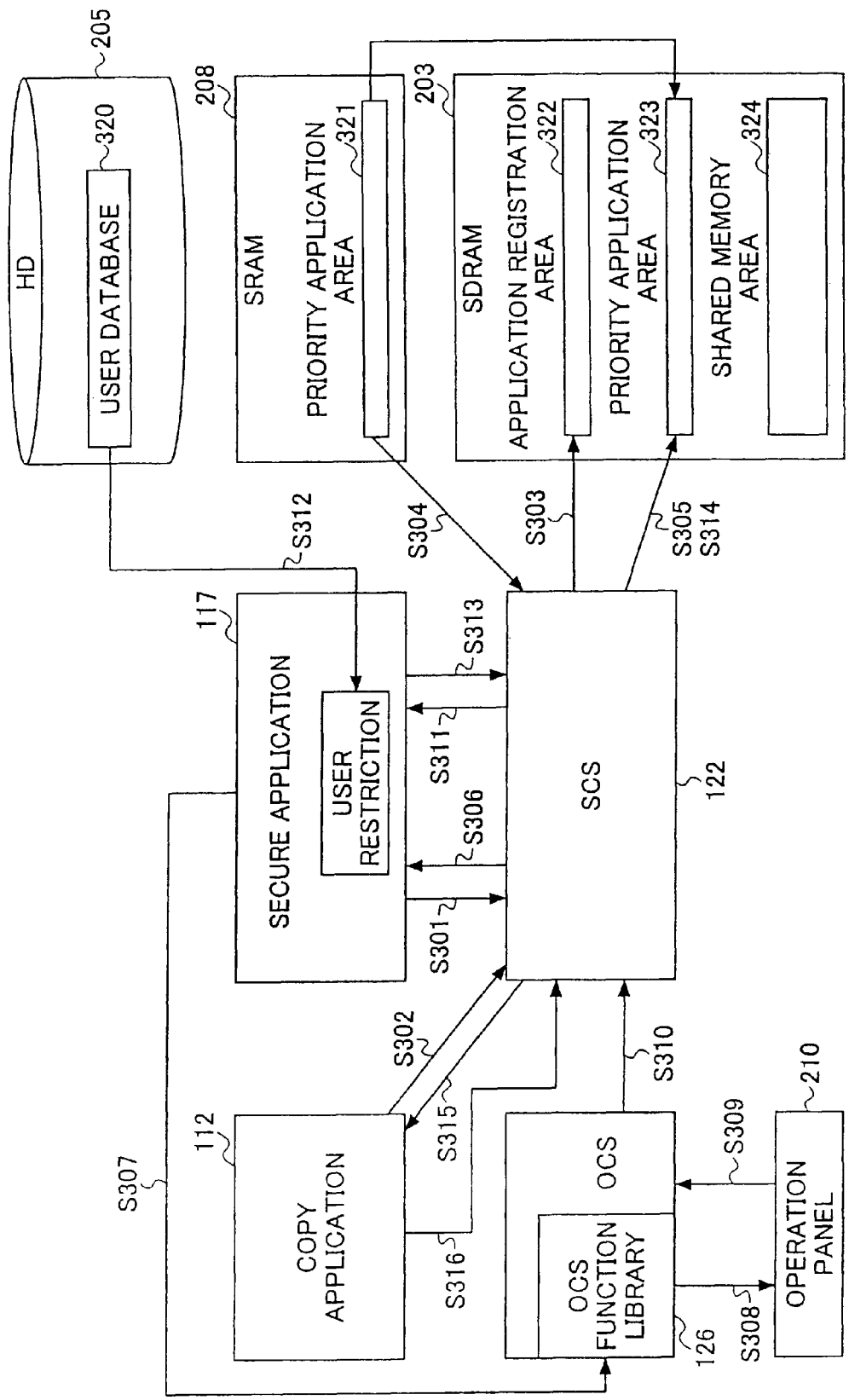
FIG. 3 is a figure for explaining the whole user restriction process according to the compound machine 100 of the first embodiment.

Next, the user restriction process will be described according to the compound machine 100 of the first embodiment. FIG. 3 is a figure for explaining the whole user restriction process according to the compound machine 100 of the first embodiment. As shown in FIG. 3, the SRAM 208 keeps the priority application area 321, and the SDRAM 203 keeps an application registration area 322, a priority application area 323 and a shared memory area 324.

Figure 4:
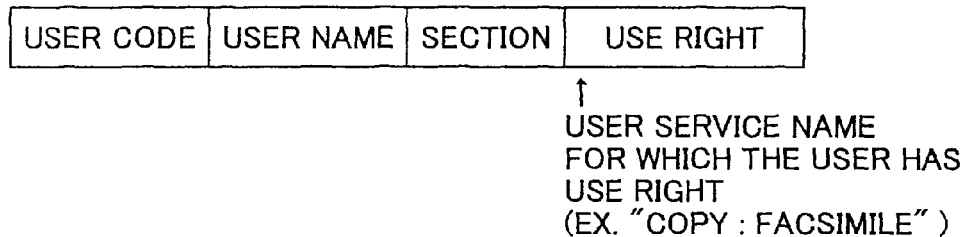
FIG. 4 shows a data structure of a record registered in the user database 320.

The hard disk (HD) 205 stores a user database 320. The user data base 320 is a file for managing users who can use the compound machine 100. FIG. 4 shows a data structure of a record registered in the user database 320. As shown in FIG. 4, the user database 320 registers data including "user code", "user name", "section", and "right of use" as one record.

The "user code" is an identification code uniquely determined for each user, and corresponds to user identification information of the present invention. "user name" is the name of the user, and "section" is a section to which the user belongs. "right of use" indicates a user service that the user can use. The "right of use" corresponds to use right information of the present invention. In the "right of use", a user service that the user can use is set among user services such as "copy", "printer", "scanner", "facsimile", "copy server" and the like. When the user can use a plurality of services, a plurality of service names are set in the "right of use", for example, "copy: facsimile".

Figure 5:
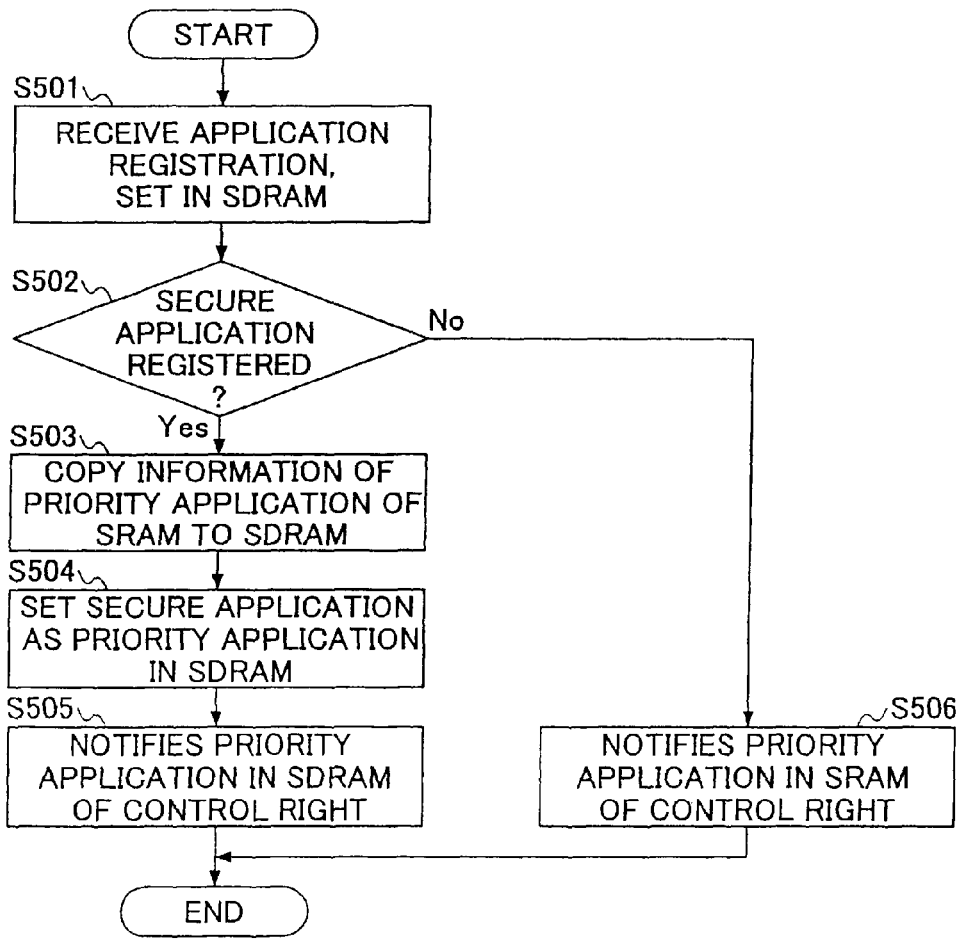
FIG. 5 is a flowchart showing a process procedure at the time when the compound machine 100 is launched by the SCS 122 in the compound machine of the first embodiment.

FIG. 5 is a flowchart showing a process procedure at the time when the compound machine 100 is launched by the SCS 122 in the compound machine of the first embodiment. In the following, the process of the SCS 122 when launching the compound machine 100 will be described.

When the power is turned on, hardware is initialized and diagnosed by a compound machine initialization part, which is not shown in the figure. Then, the general OS 121 is launched. Then, the control service is launched on the general OS 121 by the compound machine initialization part. After that, each application 130 is launched.

Every application 130 launched on the compound machine 100 sends an application registration request message to the SCS 122 in steps S301 and S302. The SCS 122 receives the application registration request message from each application 130, and registers the applications by storing identification IDs in the application registration area of the SDRAM 203 for each application in steps S303, S501. Therefore, the applications 130 operating on the compound machine 100 can be grasped by referring to the application registration area 322 of the SDRAM 203.

Next, the SCS 122 checks whether the secure application 117 is registered in the application registration area 322 in the SDRAM 203 in order to check whether the secure application 117 exists in the compound machine 100 in steps S502 and S303.

When the secure application 117 is registered, content in the priority application area 321 of the SRAM 208 is copied as it is in the priority application area 320 of the SDRAM 203 in steps S503 and S304. Then, "secure application" is set for the priority application area 323 in steps S504 and S305. This setting means that control right is provided to the secure application 117, that is, right for accessing the operation panel 210 is provided. The SCS 122 sends a notification message, to the secure application 117, indicating that the control right is provided in steps S505 and S306.

In step S502, if "secure application" is not registered in the application registration area 322 in the SDRAM 203, it is determined that the secure application 117 does not exist, the SCS 122 sends a notification message, to the application 130, indicating control right is provided in step S506, so as to perform normal processes of the compound machine without any user restriction.

Figure 6:
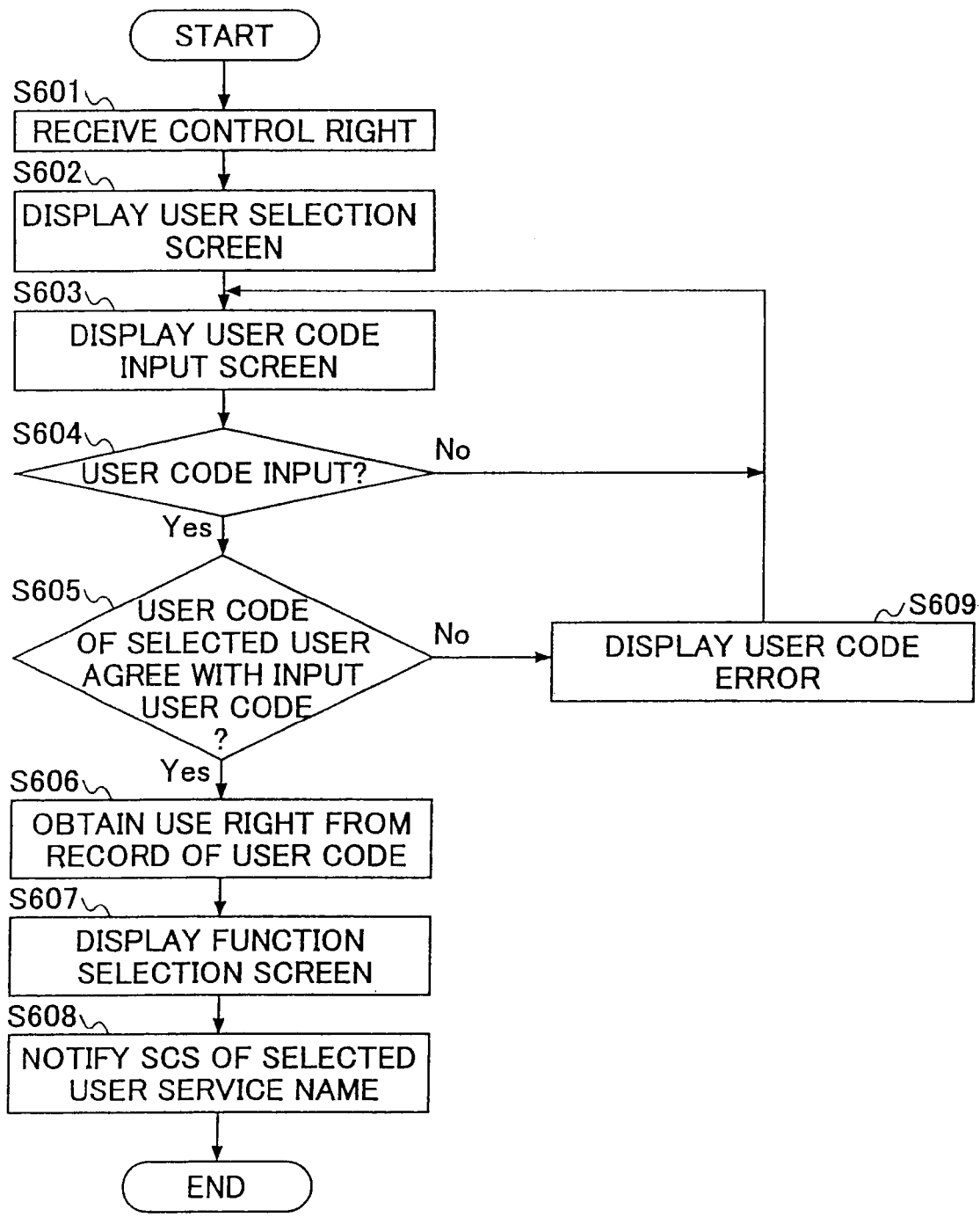
FIG. 6 is a flowchart showing the process procedure of the user restriction of the secure application 117.

Next, the user restriction process by the secure application 117 with the control right will be described. FIG. 6 is a flowchart showing the process procedure of the user restriction of the secure application 117. FIGS. 9A-9C shows examples of screens displayed on the display part of the operation panel 210 in the user restriction process.

When the secure application 117 receives the notification message indicating that the control right is provided from the SCS 122 in step S601, the secure application 117 displays an initial screen (not shown) on the operation panel 210, after that, displays a user selection screen shown in FIG. 9A in step S602. On the user selection screen, the registered user names are displayed for each tab corresponding to a section (planning, technology, sales, purchase, quality management) by referring to the user database 320 of the HD 205.

Displaying the screen on the operation panel 210 is performed by the OCS 126 according to a display request of the secure application 117. That is, the secure application 117 specifies drawing information (identification information such as a window ID and a button ID) to be displayed so as to call drawing functions to the OCS 126 in step S307. Then, the OCS 126 displays specified drawing information in step S308.

When the user name button is selected on the user selection screen, the key event is sent to the secure application 117. These operations such as key input and button pushing from the operation panel 210 are notified of to the secure application 117 via the OCS 126 and the SCS 122 as shown in FIG. 3 in steps S309, S310 and S311. More concretely, following processes are performed in the OCS126 and the SCS 122.

Figure 7:
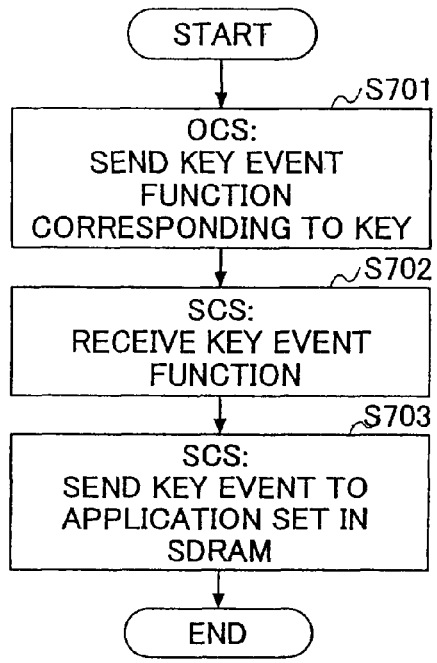
FIG. 7 is a flowchart showing a procedure for obtaining key operations from the operation panel 210 in the OCS 126 and the SCS 122 according to the compound machine of the first embodiment.

FIG. 7 is a flowchart showing a procedure for obtaining key operations from the operation panel 210 in the OCS 126 and the SCS 122 according to the compound machine of the first embodiment. As shown in FIG. 7, when key operation is performed on the operation panel 210, the OCS 126 issues a key event function corresponding to a pushed key or button so as to send a key event to the SCS 122 in step S701.

The key event function is called in the SCS 122 so that the SCS 122 receives the key event in step S702. Then, the SCS 122 sends the received key event to the application set in the priority application area 323 in the SDRAM 203 in step S703. Since the application 130 having control right on the operation panel 210 is currently set in the priority application area 323 in the SDRAM 203, the key operation is normally processed.

When the selection button of the user name is pushed on the user selection screen of step S602, the key event is sent to the secure application 117 via the OCS 126 and the SCS 122 since the secure application 117 having control right is set in the priority application area of the SDRAM 203.

When the user name is selected, the secure application 117 displays a user code input screen shown in FIG. 9B in step S603, and enters a waiting state of user code in step S604. When the user code is input, the secure application 117 determines whether a user code of the selected user name and a user code input from the operation panel are the same in steps S605 and S312.

When they are not the same, a user code error is displayed on the operation panel 210 in step S609, and the user input screen is displayed again in step S603. When they are the same, it is determined that the input user code is correct, the secure application obtains information on right of use from a record corresponding to the user code in step S606. The information includes a list of names of user services that can be used by the user, and as shown in FIG. 9C, the secure application 117 displays a function selection screen showing buttons of the listed user services in selectable manner in step S607. The example shown in FIG. 9C shows a case in which "copy: facsimile" is set as the use of right in the record of the user database 320. That is, the function selection screen of FIG. 9C shows buttons such that the "copy" button and the "facsimile" button which are diagonally shaded are selectable, other buttons are not selectable.

When the user pushes a button on the function selection screen, the secure application 117 obtains the selected service name via the OCS 126 and the SCS 122 in steps S309, S310 and S311, and notifies the SCS 122 of the selected service name in steps S608 and S313. Accordingly, the user restriction process by the secure application 117 ends.

Figure 8:
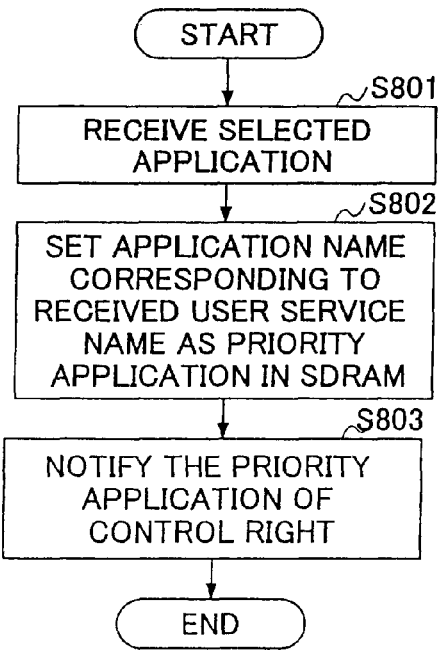
FIG. 8 is a flowchart showing a procedure of the process for changing control right by the SCS 122 according to the compound machine 100 of the first embodiment.

Next, a process for changing control right will be described. This process is performed by the SCS 122 that received the selected service name. FIG. 8 is a flowchart showing a procedure of the process for changing control right by the SCS 122 according to the compound machine 100 of the first embodiment.

As shown in FIG. 8, when the SCS 122 receives the service name selected by the user from the secure application 117 in step S801, the SCS sets an application name corresponding to the received service name in the priority application area 323 of the SDRAM 203 in steps S802 and S314. For example, when the SCS 122 receives "copy" or "copy server" as the service name, "copy application" is set in the priority application area 323. When "scanner" is received, "scanner application" is set in the priority application area 323. Then, the SCS 122 sends a notification message, to the application set in the priority application area 323, indicating that control right is provided in step S803 and the S315. Accordingly, control is changed from the secure application 117 to the application that the user selected. FIG. 3 shows an example that the control is changed to the copy application 112 as a priority application. In the first embodiment, an application name corresponding to the service name received in step S801 is once set in the priority application area 323, and then, the control right is provided to the application set in the priority application area 323. However, after receiving the service name, notification message of providing the control right may be directly sent to the application without setting application name in the priority application area 323.

When the process in the application 130 after change of control ends, the application notifies the SCS 122 that the process ends in order to change control right to other application and the like in step S316.

As mentioned above, according to the compound machine of the first embodiment, the secure application 117 restricts use of the compound machine 100 on the basis of the user code registered in the user database 320, and restricts usable functions on the basis of right of use registered in the user database 320. Thus, security of the compound machine improves.

Although restriction of use is described taking copy processing as an example, the restriction of use can be applied to other applications.

In addition, although the priority application area 321 of the SRAM 208 is copied to the SDRAM 203 so that information of the priority application area 323 in the SDRAM 203 is changed to "secure application" according to the first embodiment, the change of setting can be performed by referring to the priority application area 321 in the SRAM 208 without performing copy to SDRAM 203.

In the above-mentioned embodiment, the secure application 117 is set as a priority application, so that the user selection screen and the like is displayed next to the initial screen. However, even though the secure application 117 is not set as the priority application, the user restriction (user authentication) process can be performed. FIG. 10 shows a process flow in such a case.

After the power of the compound machine 100 is turned on, a screen for a default application (for example, copy application) is displayed on the operation panel in step S651. Or, a screen used for selecting an application is displayed on the operation panel. Next, a screen is displayed by the secure application 117 when a predetermined operation is performed for the default application, or when an application is selected on the operation panel in step S652. Then, the before-mentioned authentication of the user is performed on the basis of input by the user in step S653. If the user is authenticated, the user can use an application in step S654. If the user is not authenticated, the process goes back to step 651. In order to launch the default application or the application selection screen, for example, the control right may be given to the default application or to a program for displaying the application selection screen. Other than this process flow, for example, the authentication can be performed by executing the secure application when an application is changed to another application.

This configuration in which the secure application 117 is not set as a priority application can be applied to other embodiments.

Second Embodiment

The user restriction process is performed by inputting the user code from the operation panel 210 according to the compound machine 100 of the first embodiment. On the other hand, according to the second embodiment, the user restriction process is performed by using a flashcard.

The functional configuration, hardware configuration and process flow of user restriction and data structure of the user database 320 are the same as those shown in FIGS. 1-4 described in the first embodiment. In the compound machine 100 of the second embodiment, the user code for identifying the user is recorded in the flashcard 207. The flashcard 207 is inserted into the flashcard interface part 206, so that the user code is read from the flashcard 207. The flashcard corresponds to the recording medium of the present invention.

Figure 11:
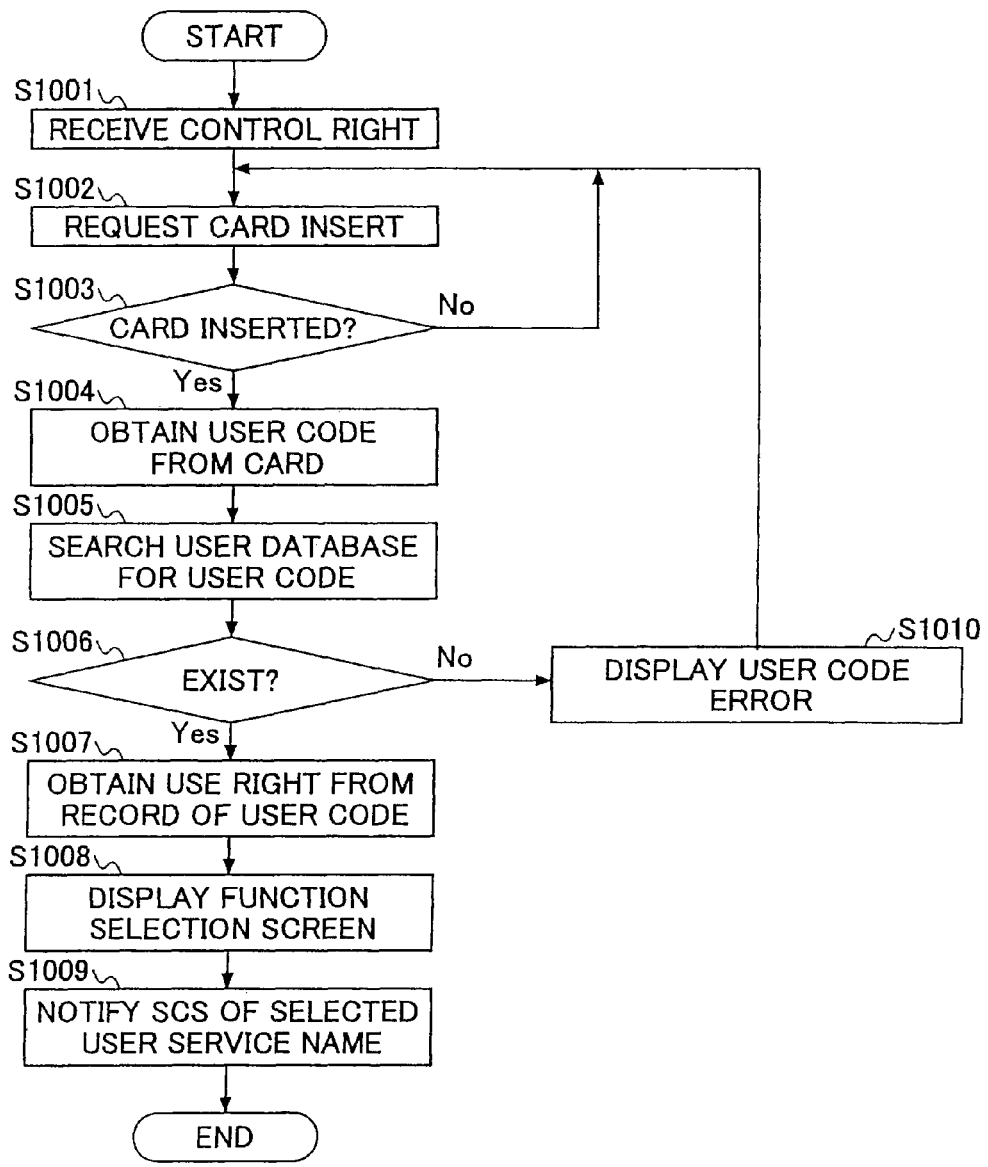
FIG. 11 is a flowchart showing a process procedure of user restriction by the secure application 117 in the compound machine 100 according to the second embodiment.

FIG. 11 is a flowchart showing a process procedure of user restriction by the secure application 117 in the compound machine 100 according to the second embodiment. As shown in FIG. 11, when the secure application 117 receives the message notifying that control right is provided from the SCS 122 in step S1001, the secure application 117 displays a card insert screen (not shown in the figure) on the operation panel 210 in step S1002. After that, the secure application enters an insert waiting state of the flashcard 2007 in step S1003.

When the flashcard 207 is inserted in the flashcard interface part 206, the secure application 117 reads and obtains the user code from the flashcard 207 in step S1004. Then, the secure application 117 searches the user database 320 in step S1005, and checks whether the obtained user code exists in a record in the user database 320 in step S1006.

If the user code obtained from the flashcard 207 is registered in the user database 320, it is determined that the user is a valid user. Processes hereinafter (steps S1007-S1009) are the same as processes (steps S606-S608) shown in FIG. 6 described in the first embodiment.

If the user code obtained from the flashcard 207 is not registered in the user database 320, it is determined that the user is not a valid user, so that a user code error is displayed on the operation panel 210 in step S1010, and the card inserting screen is displayed again in step S1002.

As mentioned above, according to the compound machine 100 of the second embodiment, the user code is recorded in the flashcard 207 beforehand, and the user code is input from the flashcard 207. Therefore, restriction of use can be realized without key operation by the user for inputting the user identification information. In addition, since the user can store the user code by using the flashcard 207, management of the user code becomes easy.

Third Embodiment

According to the compound machine 100 in the first and second embodiments, restriction of use is performed by the secure application 117. In addition to that, according to the third embodiment, the compound machine 100 obtains user history. The functional configuration, hardware configuration and the data structure of the user database 1120 are the same as those shown in FIGS. 1, 2 and 4 described in the first embodiment.

The secure application 117 performs the user restriction process. In the user restriction process, the secure application 117 checks the user of the compound machine 100 by using the user code, and restricts use of the compound machine 100 such that only a user having a user code registered in the user database 1120 can use the compound machine 100. In addition, the secure application 117 performs a user restriction process in which the secure application 117 provides only functions of which a user has right of use among user services such as copy, printer, scanner and facsimile on the basis of right of use registered in the user database 1120. In addition, the secure application 117 generates a use history file 1125 from a purpose of use, a document name and the like input by the user, and stores the use history in the hard disk 205, and sends the use history to the PC 1507 and the remote centralized management apparatus via the network.

Figure 12:
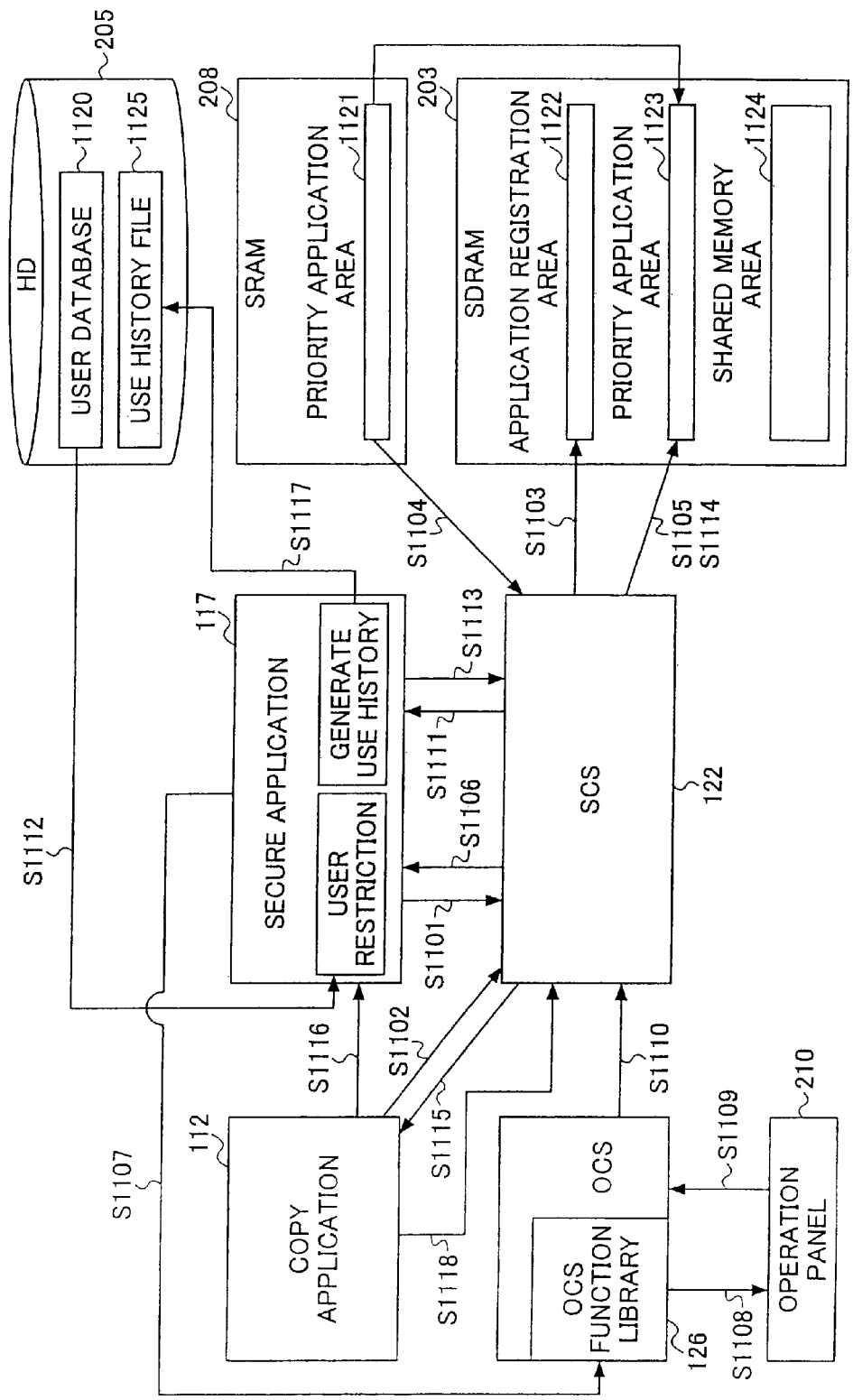
FIG. 12 is a figure for explaining flow of the user restriction process and user history generation process by the compound machine 100 according to the third embodiment.
Figure 13:
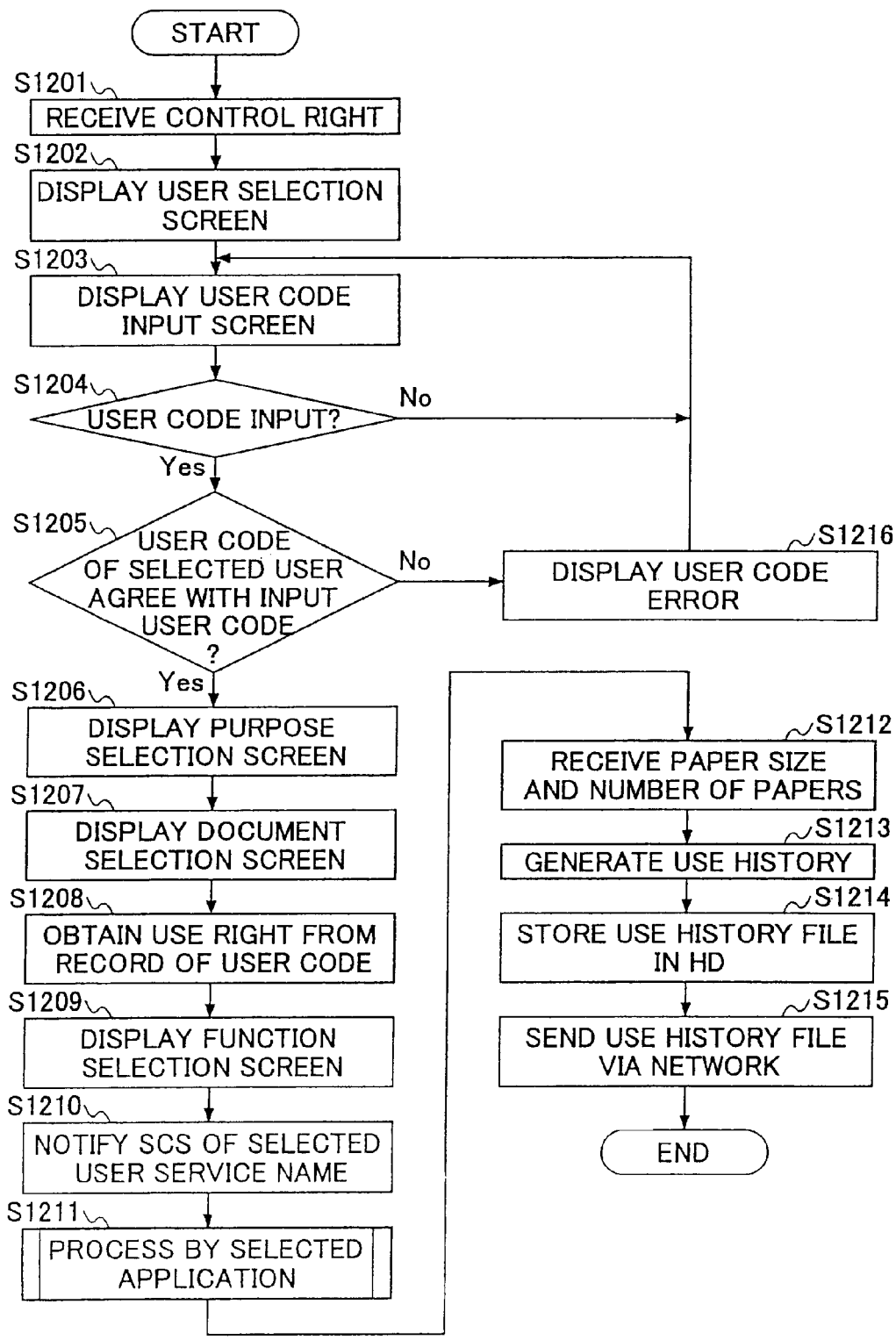
FIG. 13 is a flowchart showing a procedure of the user restriction process and the use history generation process performed by the secure application 117.
Figure 14B:
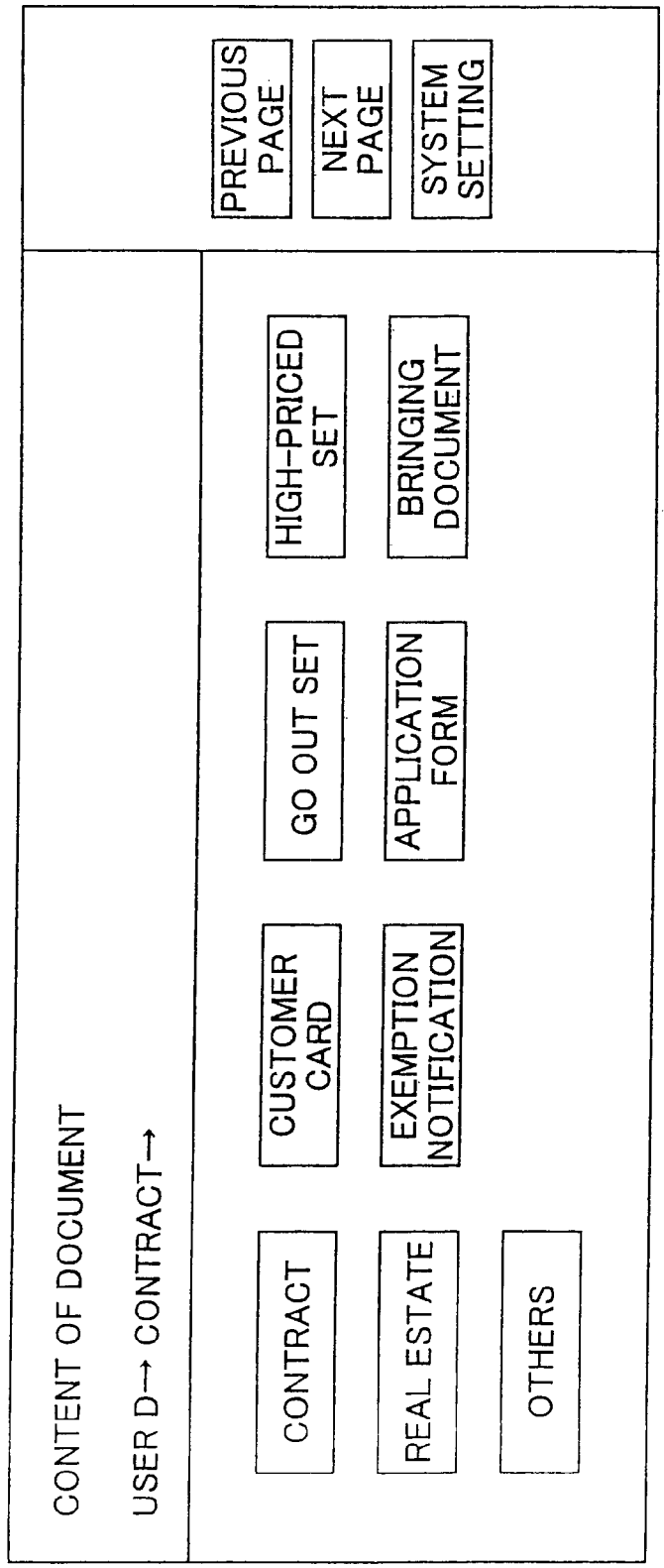

FIG. 12 is a figure for explaining flow of the user restriction process and user history generation process by the compound machine 100 according to the third embodiment. FIG. 13 is a flowchart showing a procedure of the user restriction process and the use history generation process performed by the secure application 117. FIGS. 14A-14C are examples of the screen displayed on the display part of the operation panel 210 in the use history generation process.

Processes after the compound machine 100 is launched until user restriction, including providing control right to the secure application 117 (steps S1101-S1112, and steps S1201-1205) are the same as those explained in the first embodiment with FIGS. 3, 5 and 6 (steps S301-S312, steps S501-S505, and steps S601-S605). In addition, the user selection screen and the user code input screen displayed on the operation panel 210 in the user restriction process are the same as those shown in FIGS. 9A and 9B described in the first embodiment.

When it is judged that the user code is registered in the user database 1120, the secure application 117 displays an purpose selection screen for selecting use purpose of the compound machine 100 on the operation panel 210 as shown in FIG. 14A in step S1206. When the user pushes a button having a purpose, the secure application 117 obtains the key event of the button via the OCS 126 and the SCS 122 in the same way as the first embodiment, so as to display a document name selection screen shown in FIG. 14B in step S1207. When the user pushes a button of a document name, the secure application 117 obtains the key event of the button, and obtains information of right of use from a record of the user code by referring to the user database 1120 in steps S1208 and S112. The purpose of use corresponds to the use information of the present invention, and the document name corresponds to the use information and the document information.

Then, in the same way as the case of the compound machine of the first embodiment, the function selection screen shown in FIG. 14C is displayed on the operation panel 210 such that the user selects a service name in step S1209 in which only service names to which the use of right is set can be selected. Then, the selected service name is notified of to the SCS 122 in steps S1210 and S1113. Accordingly, in the same way as the case of the first embodiment, the SCS 122 changes the control right from the secure application 117 to the selected application (which is a copy application 112 in the example of FIG. 12) in steps S1111 and S1115. In the selected application, a process specific for the application is performed in step S1211.

When the process specific for the application ends, a paper size, the number of sheets processed and the like are sent to the secure application 117 as the result of the process specific to the application in step S1116, and the secure application 117 receives the information in step S1212. Then, the secure application 117 generates use history shown in FIG. 15 from current day and time, the user code, purpose that the user selected, document name, and the received paper size and number of sheets in step S1213. The secure application 117 generates the use history as a file of the XML format. Accordingly, even when the use history 1125 is sent via the network, the use history can be easily displayed and managed on PC (personal computer) on the network.

The generated use history file 1125 is stored in the hard disk 205 in steps S1214 and S1117, and is sent to a terminal such as a PC 1507 connected to a network or a remote centralized management apparatus 1500 in step S1215. These sending processes are performed from the secure application 117 via the NCS 128. The secure application 117 and the NCS 128 corresponds to the terminal sending means and the remote sending means.

Figure 16:
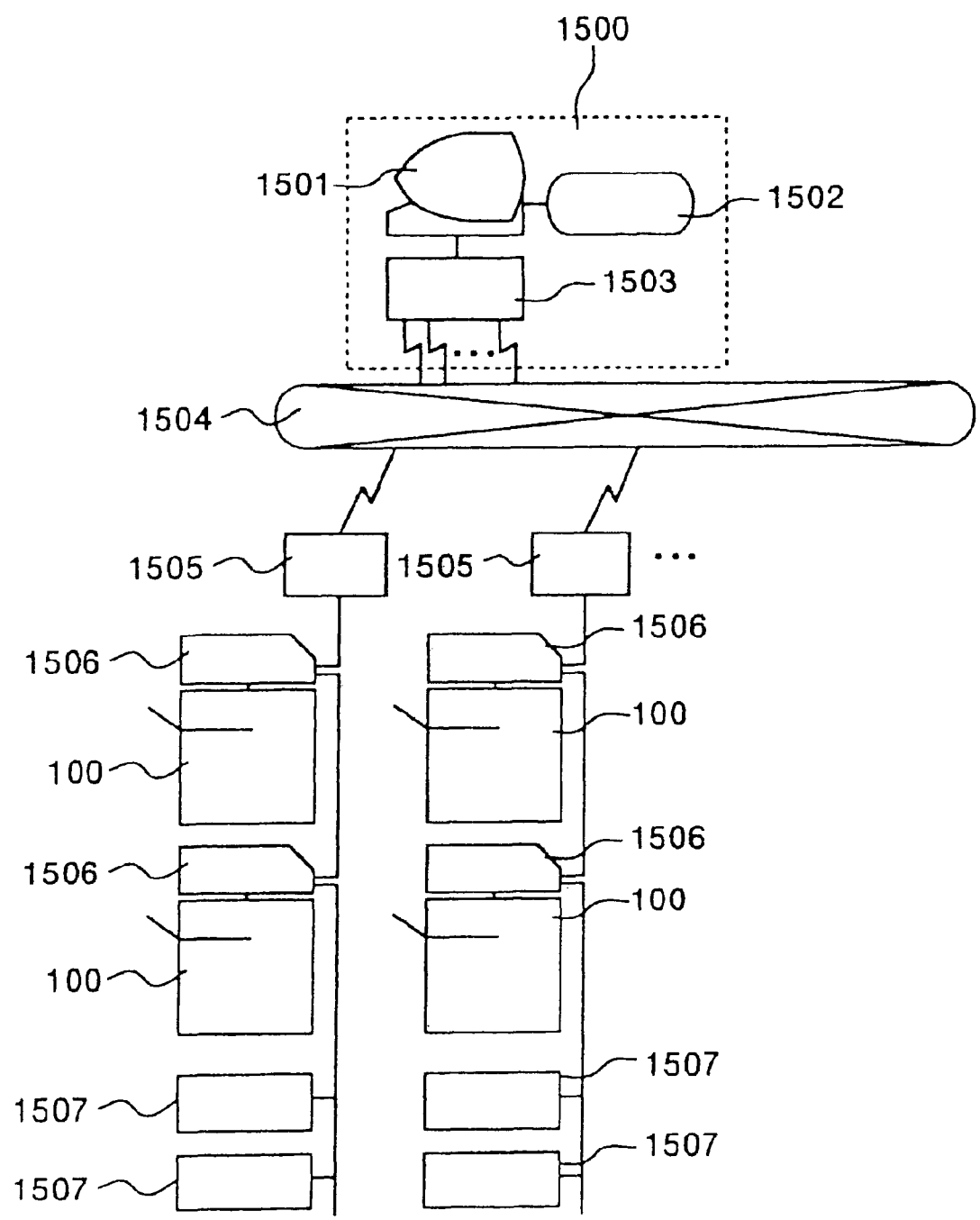
FIG. 16 is a block diagram of a remote centralized management system including the compound machine according to the third embodiment.

The process for sending the use history file 1125 to the PC and the remote centralized management apparatus will be described. FIG. 16 is a block diagram of a remote centralized management system including the compound machine according to the third embodiment. This remote centralized management system includes the remote centralized management apparatus 1500 and a plurality of compound machines 100 which are connected by public circuits.

The remote centralized management apparatus 1500 includes a computer 1501 for controlling the whole system, an external memory apparatus 1502, and multi-channel communication control apparatus (CCU) 1503, in which the external memory apparatus 1502 is an optical magnetic disk, a magnetic tape, a flexible disk (FD), IC card or the like. A public circuit network 1504 is connected to the multi-channel communication control apparatus 1503. In addition, a plurality of pairs of a key card apparatus 1506 and the compound machine 100 are connected to the multi-channel communication apparatus via each communication adapter 1505. In addition, PCs 1507 are connected to the compound machine 100 as printer clients by a network such as LAN.

The key card apparatus 1506 is connected to each compound machine 100 that is located in a customer's site, and is configured such that use information and failure information of the compound machine are output to the communication adapter 1505. The communication adapter 1505 is provided near the key card apparatus 1506 and the compound machine 100. In addition, the communication adapter 1505 is connected to a facsimile apparatus or a telephone in the customer's site. The communication adapter 1505 is configured such that data communication (off-talk communication method) is available between the multi-channel communication control apparatus 1503 and the communication adapter 1505 via the public circuit network 1504.

The secure application 117 sends the generated use history file 1125 to the remote centralized management apparatus 1500 via the key card apparatus 1506 and the communication adapter 1505 by using the public circuit network 1504. In addition, the secure application 117 sends the generated use history file 1125 to the PC1507, which is a client terminal, via the LAN.

As mentioned above, according to the compound machine 100, the secure application 117 requests selection of use purpose or document name from the user, and generates use history file 1125 from the input use purpose and the document name. Thus, the use purpose and the document name can be stored as the use history file 1125, so that security can be improved by using the use history.

In addition, since the compound machine of the third embodiment sends the generated use history file 1125 to the remote centralized management apparatus 1500, the use history file 1125 can be referred to and calculated in the remote centralized management apparatus 1500. Thus, the image forming apparatus can be properly managed on the basis of the use history file 1125 by the remote centralized management apparatus.

Although history information includes use purpose and document name according to the third embodiment, the compound machine 100 may generate history information including other information on use. For example, in addition to the information items shown in FIG. 5, a link to OCR data of documents and a link a thumbnail of documents can be recorded as the use history file, in which the OCR data and the thumbnail are automatically generated. By recording such information, the use history file can be used for preventing fraud, in addition to managing use status.

In addition, although generation of the use history file 1125 is described taking copy process as an example, the use history file 1125 can be generated for other applications in the same way.

Fourth Embodiment

According to the compound machine 100 of first to third embodiments, secure application 117 that is provided in the application layer performs user restriction and use history generation. According to this forth embodiment, a secure control service provided in the control service layer performs user restriction and use history generation process.

Figure 17:
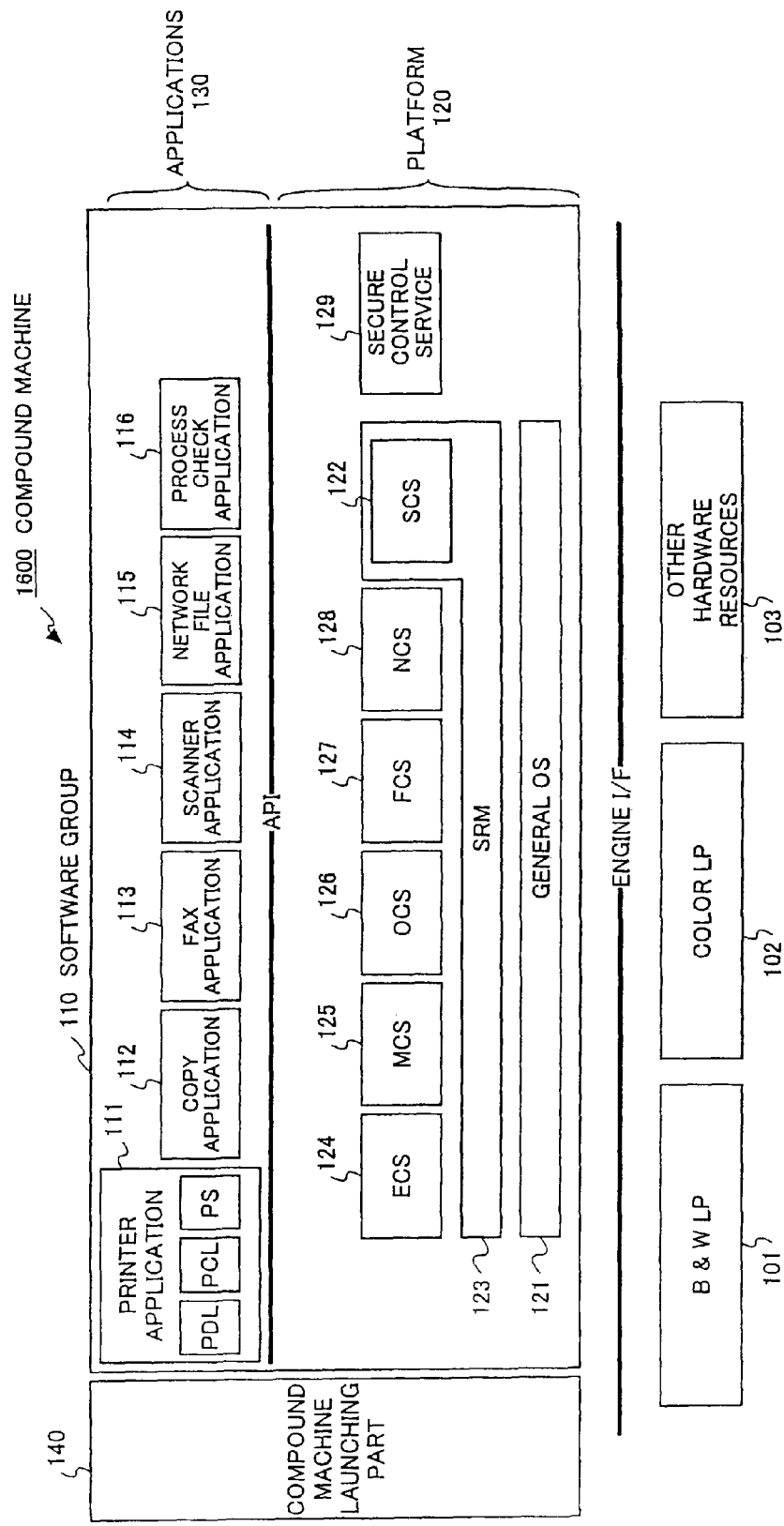
FIG. 17 is a block diagram showing a functional configuration of a compound machine 1600 according to the fourth embodiment.

FIG. 17 is a block diagram showing a functional configuration of a compound machine 1600 according to the fourth embodiment. The hardware configuration of this compound machine is the same as that of the compound machine 100 of the first embodiment. Difference between the compound machine 1600 of the fourth embodiment and the compound machine 100 of the first embodiment is that the compound machine is provided with the secure control service 129 instead of the secure application 117 as shown in FIG. 17.

The secure control service 129 performs a user restriction process in which the secure control service 129 checks a user of the compound machine 1600 by using a user code such that only a usr having a user code registered in the user database 1730 can use the compound machine 1600, in addition, the secure control service 129 checks right of use registered in the user database 1730 such that the compound machine 1600 provides only a function for which a user has use of right among functions such as copy, printer, scanner, facsimile and the like. Further, the secure control service 129 generates a use history file from a use purpose, document name and the like that the user inputs, and stores the use history file in the hard disk 205. In addition, in the same way as the compound machine of the third embodiment, the use history file is sent to the PC1507 and to the remote centralized management apparatus 1500 via the network. Both of the secure control service 129 and the NCS 128 forms terminal sending means and remote sending means of the present invention.

Figure 18:
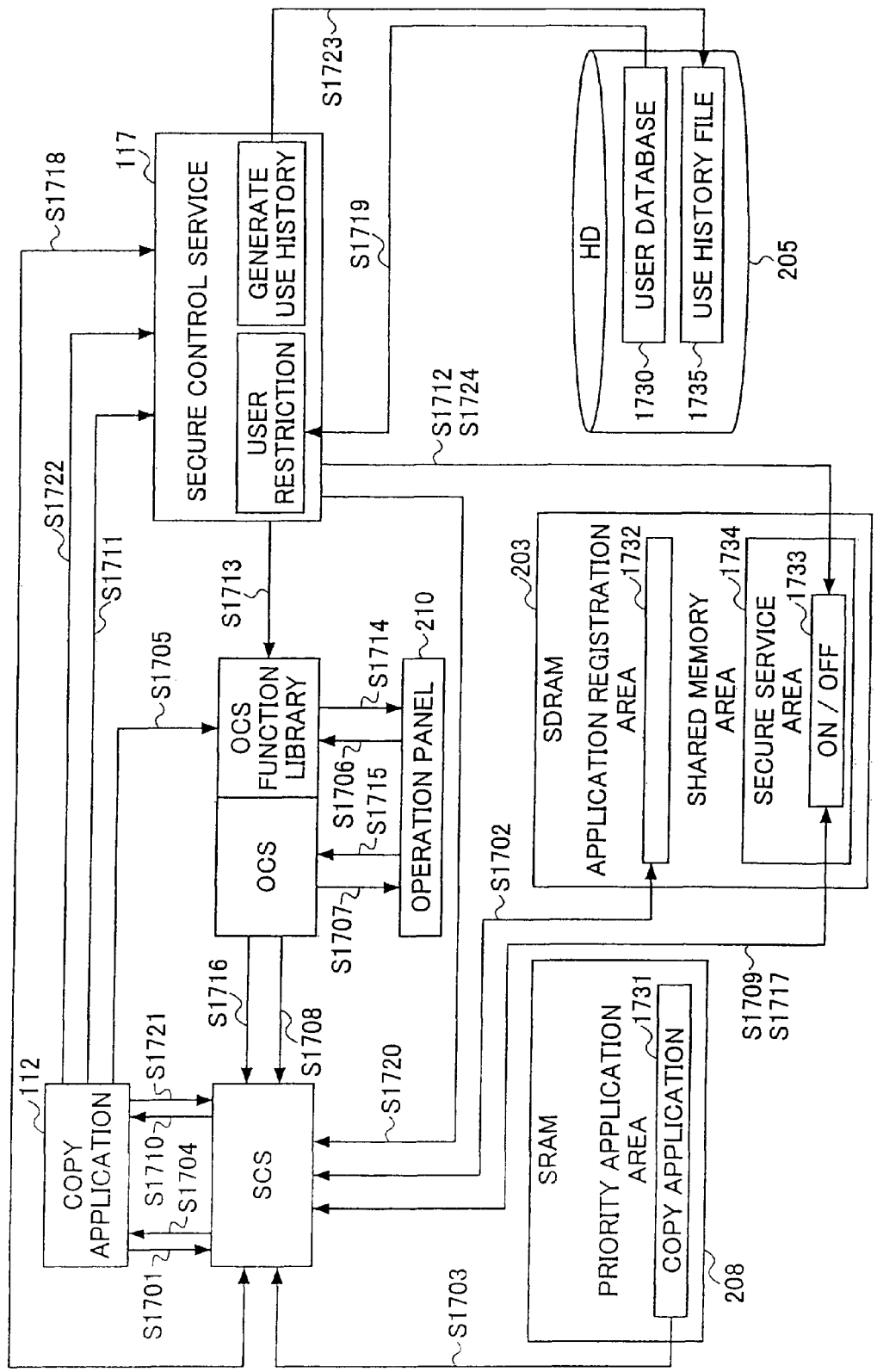
FIG. 18 is a figure for explaining flow of the use restriction process and the use history generation process.

Next, the use restriction process and the use history generation process by the secure control service 129 according to the fourth embodiment will be described. FIG. 18 is a figure for explaining flow of the use restriction process and the use history generation process.

SRAM 208 keeps a priority application area 1731 in which an application having control right is registered. SDRAM 203 includes an application registration area 1732 and a shared memory area 1734, in which a name of an application operating on the compound machine 1600 is registered in the application registration area 1732, and the shared memory area 1734 is shared by processes of applications and processes of control services such as the SCS 122 and the secure control service 129. According to the compound machine 1600 of the fourth embodiment, the secure control service 129 in the control service layer performs the user restriction process and the use history generation process, and the applications 130 for providing user services of copy, printer, scanner, facsimile and the like launches first. Thus, unlike the SDRAM 203 of the compound machine 100 of the first embodiment, the priority application area that is copied from the SRAM 208 is not kept.

In the compound machine 1600 of the fourth embodiment, a secure service area 1733 is provided in the shared memory area 1734 for indicating whether the user restriction and the use history process is currently performed by the secure control service 129. "ON" is set in the secure service area 1733 by the secure control service 129 when starting the user restriction and the use history process. When ending user restriction and use history process, "OFF" is set by the secure control service 129. When the SCS 122 determines a sending destination of the key event, the SCS 122 checks the secure service area 1733. When the compound machine 1600 is initialized (launched), "OFF" is set in the secure service area 1733.

The data structure of the user database 1730 stored in the hard disk 205 is the same as that of FIG. 4 described in the first embodiment.

Like the compound machine 100 of the first embodiment, when the compound machine 1600 is launched, hardware is initialized and diagnosed, and the general OS 121 is launched. After that, each control service and each application are launched. The launched application 130 sends an application registration request message to the SCS 122 in step S1701. The SCS 122 that receives the message registers each application name that sent the application registration request message in the application registration area 1732 in the SDRAM 203 in step S1702. FIG. 18 shows an example in which the application registration request message is received from the copy application 112. Thus, it is assumed that the copy application is operating in the following description.

Next, the SCS 122 reads the priority application area 1731 of the SRAM 208 in step S1703, and the SCS 122 sends a message to the copy application 112 that is set in the priority application area 1731 in step S1704, wherein the message indicates that the copy application 112 is provided with control right for displaying a screen on the operation panel 210 and obtaining a key operation.

Figure 19:
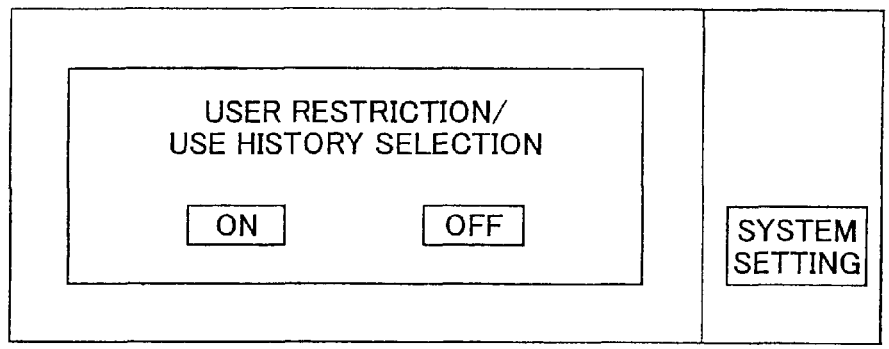
FIG. 19 shows a user restriction/use history selection screen.

The copy application 112 provided with the control right displays a user restriction/use history selection screen on the operation panel 210 via the OCS 126 as shown in FIG. 19, in which the screen is used for instructing use of the functions of the user restriction/use history in steps S1705 and S1706.

When the user pushes "ON" button in the user restriction/use history selection screen, the user restriction and use history generation process starts as described in the following. On the other hand, when "OFF" button is pushed, the user restriction and the use history generation process is not performed, so that normal process of the application 130 (copying in the case shown in FIG. 18) is performed. In the following, the first case in which "ON" button is pushed is described.

Figure 20:
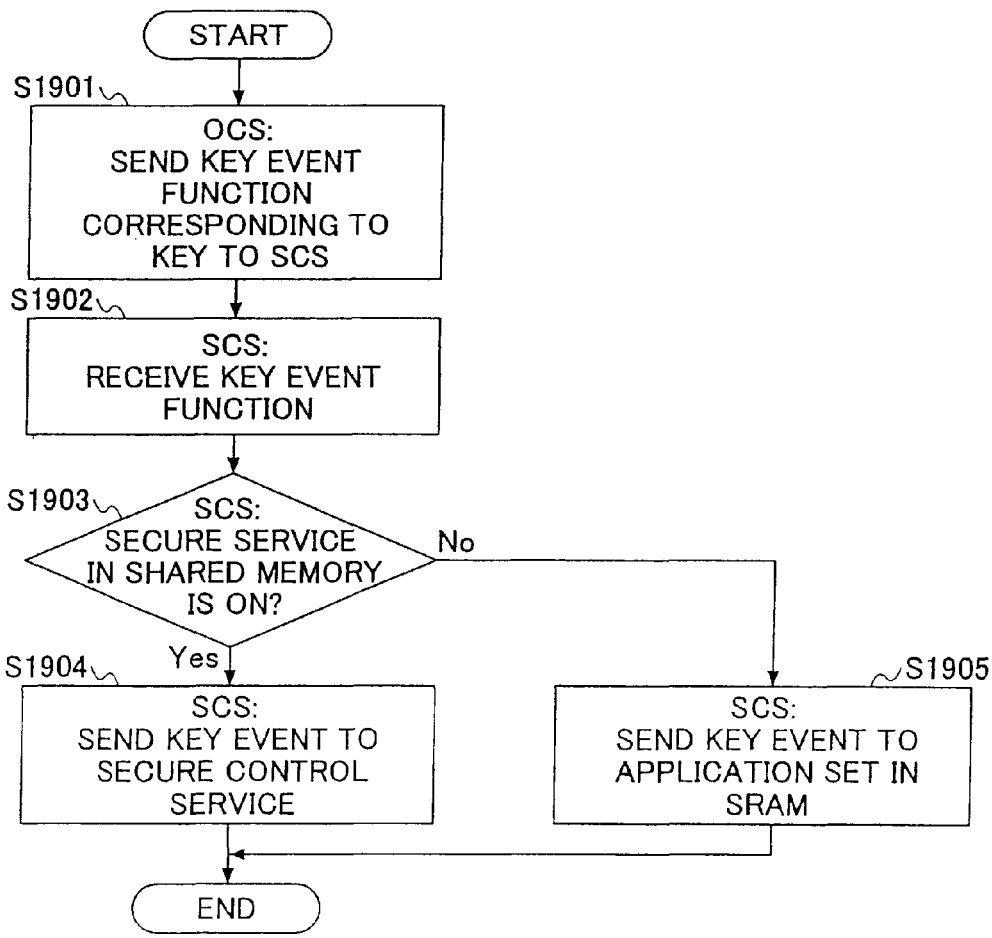
FIG. 20 is a flowchart showing a procedure for obtaining a key operation from the operation panel 210 by the OCS 126 and the SCS 122.

FIG. 20 is a flowchart showing a procedure for obtaining a key operation from the operation panel 210 by the OCS 126 and the SCS 122. As shown in FIG. 20, when an key operation arises on the operation panel 210, the OCS 126 executes a key event function corresponding to a key or a button and sends a key event to the SCS 122 in step S1901.

When the SCS 122 receives the key event by receiving the key event function call in step S1902, the SCS 122 checks whether "ON" is set in the secure service area 1733 in the shared memory 1734 for determining a sending destination of the key event in step S1903. That is, according to the fourth embodiment, an application 130 is always set in the priority application area 1731, so that the application has the control right. Therefore, the SCS 122 determines whether the key event is sent to the secure control service 129.

When "ON" is set in the secure service area 1733, the SCS 122 determines that a key operation is requested by the secure control service 129 since the user restriction process and the use history generation process are being executed, and sends the key event to the secure control service 129 in step S1904.

On the other hand, when "OFF" is set in the secure service area 1733, the user restriction and the use history processes are not performed. Thus, the SCS 122 determines that there is no request for key operation from the secure control service 129, so that the SCS 122 sends the obtained key event to the application 130 (that has control right currently) that is set in the priority application area 1731 of the SRAM 208 in step S1905.

In FIG. 17, when the user pushes "ON" button on the user restriction/use history selection screen, the key event corresponding to the "ON" button is sent to the SCS 122 via the OCS 126 in steps S1707 and S1708. The SCS 122 refers to the secure service area 1733 in step S1709. However since "OFF" is set at this time, the SCS 122 sends the obtained key event to the copy application 112 in step S1710.

The copy application 112 that receives the key event of the "ON" button sends an execution request message for the user restriction and the use history generation process to the secure control service 129 in step S1711. The secure control service 129 that receives the execution request message sets "ON" in the secure service area 1733 of the shared memory 1734 in step S1712 first.

Next, the secure control service 129 sequentially displays a user selection screen, a user code input screen, a purpose selection screen, a document name selection screen and a function selection screen on the operation panel 210 via the OCS 126 in steps S1713 and S1714. In addition, the secure control service 129 obtains key operations from each screen via the OCS 126 and the SCS 122, and performs the user restriction process by referring to the user database 1730 in steps S1715-1719. Detailed processes for the user restriction are the same as those by the secure application 117 described in the third embodiment. In these processes, since "ON" is set in the secure service area 1733 in the shared memory 1734, the key event obtained by the SCS 122 is sent to the secure control service 129, not to the copy application 129 in step S1718.

When the secure control service 129 ends the user restriction process, the secure control service 129 sends a process result to the SCS 122 in step S1720. The SCS 122 sends a process end notification message to the copy application 112 (that is set in the priority application area 1731) in step S1721. Then, the copy application 112 performs a copy process. When the copy process ends, the copy application 112 sends the process end notification message to the secure control service 129 with the paper size and the number of processed papers in step S1722.

When the secure control service 129 receives the process end notification message, the paper size and the number of papers, the secure control service 129 generates the use history file 1735 shown in FIG. 15 by using XML format from current day and time, the user code, the purpose and document name that the user selected, the received paper size and the number of the papers. Then, the use history file 1735 is stored in the hard disk 205 in step 1723. In addition, the secure control service 129 sends the use history file 1735 to the PC1507 and the remote centralized apparatus 1500 via the NCS 128 like the compound machine 100 of the third embodiment.

Finally, the secure control service 129 sets "OFF" in the secure service are 1733 of the shared memory 1734 in step S1724, so that the user restriction process and the use history generation process end.

As mentioned above, the compound machine is provided with the secure control service 129 in the control service layer, and the secure control service 129 performs the user restriction process and the use history generation process. Thus, the use history generation function can be commonly provided for the applications 130 that are operating on the control service layer, so that software development labor for security functions can be decreased.

Although user restriction and generation of the use history file 1735 are described taking copy process as an example according to the fourth example, user restriction and generation of the use history file 1735 can be performed for other applications in the same way.

Although the compound machine according to the first to fourth embodiments, the OCS 126 once receives the key event of the key operation from the operation panel 210 and the OCS 126 sends the key event to the SCS 122, the SCS 122 may directly obtains the key event from the operation panel 210. In this case, the OCS 126 has only functions for outputting drawing to the operation panel 210.

As mentioned above, the image forming apparatus includes: at least an application for providing a user service relating to an image forming process; an operation panel for receiving a key operation input; a user database in which user identification information for identifying an user of the image forming apparatus is included; a secure program (corresponding to the secure application) used for determining whether the user service can be provided on the basis of the user identification information in the user database and another user identification information input by the user.

In the image forming apparatus, the image forming apparatus may execute the secure program so as to authenticate the user when a key operation input for executing the application is received by the operation panel. In addition, the image forming apparatus may execute the secure program so as to authenticate the user when an application selection operation is performed on an application selection screen displayed on the operation panel.

The image forming apparatus further includes hardware resources used for image forming processes, and at least a control service between the application and the hardware resources, wherein the secure program is an secure application included in the image forming apparatus as one of the application.

According to the image forming apparatus, users of the image forming apparatus can be restricted to ones that are registered beforehand, so that security of the image forming apparatus can be improved. In addition, since the image forming apparatus has the configuration having the control service for requesting, managing and performing execution control of hardware resources, the security function can be realized only by providing the user database and the secure application. Thus, compared with the conventional image forming apparatus, security can be easily improved. In addition, since the application is operated on the application layer in the image forming apparatus, data can be sent/received between the secure application and the control service by using application program interfaces. Thus, work load for developing the secure application and the control service can be decreased.

"user service" in this specification is a service related to image forming process performed by a copier, a printer, a scanner, a facsimile or the like. For example, if a new service becomes providable by addicting the new application, a user service of the new application is included in "user service".

In addition, "user identification information input by user" includes user identification information input by key operation from the operation panel, and user identification information input by inserting a recording medium such as a flashcard into a recording medium interface part.

In the image forming apparatus, the user database registers use right information indicating usable one or more user services for each piece of user identification information, and the secure application restricts use of one or more application on the basis of the user right information.

According to the image forming apparatus, a user service to be provided to a user can be changed according to the user, so that security can be augmented in consideration of section or position of the user.

In the image forming apparatus, control right for the operation panel is provided to the secure application, and the image forming apparatus further includes: a system control service for sending a key event caused by a key operation from the operation panel to the secure application.

According to the image forming apparatus, since control priority for the operation panel is provided to the secure application, it can be avoided that other application outputs drawing on the operation panel and it can be avoided that a key operation from the operation panel is obtained by other application while user restriction process is being executed by the secure application. Thus, the security can be enhanced while the user restriction process is being executed.

In the image forming apparatus, the image forming apparatus further includes: a memory part for keeping a priority application area in which at least an application to which the control right is given is registered; wherein the system control service registers the secure application in the priority application area when the image forming apparatus is launched.

According to the image forming apparatus, the secure application can be automatically executed first among applications. The security can be enhanced when the image forming apparatus is launched.

In the image forming apparatus, the system control service gives control right to an application other than the secure application after the secure application determines whether an user service can be provided to the user, and the system control service sends a key event to the application to which control right is given.

Accordingly, right after the user restriction process by the secure application ends, a normal user service can be provided by other application.

In the image forming apparatus, the secure application requests the user to select a user service after the secure application determines whether a user service can be provided to the user, and the system control service gives control right to an application corresponding to the user service that the user selected.

Accordingly, right after the user restriction process by the secure application ends, a user service that the user wants can be provided.

The image forming apparatus may further includes an operation panel control service for outputting drawing information of a screen of user restriction on the operation panel, obtaining a key event from the screen of user restriction, and sending the key event that is obtained to the system control service. By the operation panel control service, output of screen on the user restriction and key operation on the screen can be performed smoothly.

In the image forming apparatus, the operation panel control service includes a service function library including drawing functions for outputting drawing information, wherein the secure application requests output of drawing information by calling the drawing functions.

According to the image forming apparatus, the screen on the user restriction can be output on the operation panel by using a simple interprocess communication by a function call. Thus, work load for developing the secure application can be decreased.

In the image forming apparatus, the secure application receives the user identification information from a recording medium storing the user identification information beforehand. Accordingly, the user restriction can be realized without inputting the user identification information by performing key operation by the user, so that convenience for the user improves. In addition, since the user can keep the user identification information as the recording medium, management of the user identification information becomes easy.

According to the present invention, the image forming apparatus may includes hardware resources used for image forming processes, and at least a control service between the application and the hardware resources, wherein the secure program is an secure control service included in the image forming apparatus as one of the control service. According to the image forming apparatus, since the secure control service operates on the control service layer, the user restriction function can be commonly provided to one or more applications operating above the control service layer. Thus, it becomes unnecessary to develop software of the security function for each user service individually, so that work load for developing software decreases.

In the image forming apparatus, the user database registers use right information indicating usable one or more user services for each piece of user identification information, and the secure control service restricts use of one or more application on the basis of the user right information.

According to the image forming apparatus, a user service to be provided to a user can be changed according to the user, so that security can be augmented in consideration of section or position of the user.

In the image forming apparatus, whether the secure control service performs a user restriction process or not is determined according to selection by a user.

According to the image forming apparatus, the user can determines whether the security function is used while the security function is installed. Thus, usability of the image forming apparatus increases.

The image forming apparatus may further includes: a memory part for keeping a secure service area in which execution state of the secure control service is set; and a system control service for sending a key event from the operation panel to the secure control service when the secure service area indicates that the secure control service is executed, and for sending the key event to the application when the secure service area indicates that the secure control service is not executed.

According to the image forming apparatus, the key event input from the operation panel can be switched according to whether the user restriction process is being executed, so that malfunction of the user service and the security function can be avoided.

The image forming apparatus may further includes: an operation panel control service for outputting drawing information of a screen of user restriction on the operation panel, obtaining a key event from the screen of user restriction, and sending the key event that is obtained to the system control service.

In addition, the present invention is an image forming apparatus, including: at least an application for providing a user service relating to an image forming process; an operation panel for receiving a key operation input; a secure program for requesting a user to input use information on use status of the image forming apparatus, and generating use history information on the use information; and a control program for obtaining a key event on the use information input from the operation panel, and sending the key event to the secure program.

The image forming apparatus further includes hardware resources used for image forming processes, and at least a control service between the application and the hardware resources, wherein the secure program is an secure application included in the image forming apparatus as one of the application, and the control program is a system control service included in the image forming apparatus as one of the control service.

According to the image forming apparatus, the security can be enhanced in consideration of history of use status. In addition, since the secure application is operated on the application layer in the image forming apparatus, data can be sent/received between the secure application and the control service or other control services by using application program interfaces. Thus, work load for developing the secure application and the system control service can be decreased.

In the image forming apparatus, the secure application requests input of document information indicating the kind of a document to be processed as the use information, and the secure application generates the use history information on the basis of the document information.

According to the image forming apparatus, the kinds of documents can be stored in addition to the use status of the image forming apparatus as the use history information. Thus, the security can be enhanced in consideration of history of documents processed in the past.

According to the present invention, the image forming apparatus may further includes hardware resources used for image forming processes, and at least a control service between the application and the hardware resources, wherein the secure program is an secure control service included in the image forming apparatus as one of the control service, and the control program is a system control service included in the image forming apparatus as another one of the control service. Thus, the security can be enhanced in consideration of history of documents processed in the past. In addition, according to the image forming apparatus, since the secure control service operates on the control service layer, the use history generation function can be commonly provided to one or more applications operating above the control service layer. Thus, it becomes unnecessary to develop software of the security function for each user service individually, so that work load for developing software decreases.

The image forming apparatus further includes a terminal sending part for sending the use history information to a client terminal connected to a network. Accordingly, the use history information can be stored not only in the image forming apparatus but also in the client terminal. Thus, calculation and processing on the use history information becomes available as necessary, so that the use history information can be sued effectively.

The image forming apparatus may further includes a remote sending part for sending the use history information to a remote centralized management apparatus for collecting operation information from a plurality of image forming apparatuses connected to a network. By this configuration, the remote centralized management apparatus can refer to or perform processing on the use history information. Thus, the remote centralized management apparatus can perform proper management of the image forming apparatus on the basis of the use history information.

In addition, the present invention is a user restriction method for restricting use of an image forming apparatus by an user, the image forming apparatus comprising: at least an application for providing a user service relating to an image forming process; and an operation panel for receiving a key operation input, the user restriction method comprising the steps of: receiving user identification information for identifying an user of the image forming apparatus; and a secure program in the image forming apparatus determining whether the user service can be provided on the basis of another user identification information registered in a user database in the image forming apparatus and the user identification information that is received.

In addition, an use history generation method is provided, in which the use history generation method is used for generating use history of an image forming apparatus, image forming apparatus comprising: at least an application for providing a user service relating to an image forming process; and an operation panel for receiving a key operation input, the use history generation method comprising the steps of: a secure program in the image forming apparatus requesting a user to input use information on use status of the image forming apparatus, and generating use history information on the use information; and a control program in the image forming apparatus obtaining a key event on the use information input from the operation panel, and sending the key event to the secure program.

In addition, a computer readable medium is provided, in which the computer readable medium stores program code for causing an image forming apparatus to perform a user restriction process, the image forming apparatus comprising: at least an application for providing a user service relating to an image forming process; an operation panel for receiving a key operation input; and a user database in which user identification information for identifying an user of the image forming apparatus is included, the computer readable medium comprising: secure program code means for determining whether the user service can be provided on the basis of the user identification information in the user database and another user identification information input by the user.

In addition, a computer readable medium is provided, in which the computer readable medium stores program code for causing an image forming apparatus to generate use history information, the image forming apparatus comprising: at least an application for providing a user service relating to an image forming process; and an operation panel for receiving a key operation input, the computer readable medium comprising: secure program code means for requesting a user to input use information on use status of the image forming apparatus, and generating use history information on the use information.

According to the computer readable medium such as a floppy disk, magnetic tape, CD-ROM and the like, by installing the program stored in the computer readable medium into an image forming apparatus, the image forming apparatus can perform the user restriction function or the use history generation function of the present invention.

The present invention is not limited to the specifically disclosed embodiments, and variations and modifications may be made without departing from the scope of the present invention.

What is claimed:

1. An apparatus comprising:
a processor configured to control the apparatus;
an application registration unit, in conjunction with the processor, configured to register applications and a secure application, the application and secure application each being executable;
a display device;
an operating system configured to execute the applications and the secure application;
a control unit, in conjunction with the processor, configured to instruct the registered secure application to perform user authentication based on user identification information that identifies a user, and configured to display a selection screen when the user authentication is successful with respect to the user, an application for which the authenticated user has a right of use from amongst the registered applications being selectable on the selection screen.

2. The apparatus as claimed in claim 1,
wherein
the control unit displays the selection screen,
the application for which the authenticated user has a right of use from amongst the registered applications is selectable on the selection screen, and
an application for which the authenticated use does not have a right of use from amongst the registered applications is unselectable on the selection screen.

3. The apparatus as claimed in claim 1,
wherein the secure application sends a display request for displaying the selection screen to the control unit, and
the control unit displays the selection screen based on the display request sent from the secure application.

4. The apparatus as claimed in claim 3,
wherein the secure application sends the display request to the control unit via a predefined interface.

5. The apparatus as claimed in claim 1, further comprising:
an interface configured to obtain the user identification information from an external recording medium.

6. The apparatus as claimed in claim 5, further comprising:
a storage device configured to store user authentication information,
wherein the secure application performs the user authentication based on the user identification information obtained from the external recording medium via the interface and the user authentication information stored in the storage device.

7. The apparatus as claimed in claim 1, wherein the user identification information is a user code or a user name.

8. A method implemented by an apparatus having a processor configured to control the apparatus, comprising:

registering, in conjunction with the processor, applications and a secure application, the applications and the secure application each being executable;

executing, in conjunction with the processor, the applications and the secure application;

instructing, in conjunction with the processor, the registered secure application to perform user authentication based on user identification information that identifies a user; and displaying a selection screen when the user authentication is successful with respect to the user, an application for which the authenticated user has a right of use from amongst the registered applications being selectable on the selection screen.

* * * * *